(12) United States Patent
Kojima

(10) Patent No.: US 8,638,748 B2
(45) Date of Patent: Jan. 28, 2014

(54) BASE STATION AND SERVICE FLOW ESTABLISHMENT METHOD

(75) Inventor: Yuji Kojima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 783 days.

(21) Appl. No.: 12/472,826

(22) Filed: May 27, 2009

(65) Prior Publication Data

US 2010/0054208 A1 Mar. 4, 2010

(30) Foreign Application Priority Data

Aug. 29, 2008 (JP) ................................. 2008-222476

(51) Int. Cl.
*H04W 4/00* (2009.01)

(52) U.S. Cl.
USPC ........ 370/331; 370/235; 370/312; 370/395.3; 455/422.1; 455/405

(58) Field of Classification Search
None
See application file for complete search history.

(56) References Cited

U.S. PATENT DOCUMENTS

| | | | |
|---|---|---|---|
| 7,653,759 B2 | 1/2010 | Sugaya | |
| 7,869,807 B2 | 1/2011 | Shimizu | |
| 8,228,873 B2 | 7/2012 | Park et al. | |
| 2005/0070283 A1 | 3/2005 | Hashimoto et al. | |
| 2007/0178880 A1* | 8/2007 | Saito et al. | 455/405 |
| 2007/0202866 A1* | 8/2007 | Tsuchiya | 455/422.1 |
| 2007/0211726 A1* | 9/2007 | Kuang et al. | 370/395.3 |
| 2009/0022054 A1* | 1/2009 | Kim et al. | 370/235 |
| 2009/0161555 A1* | 6/2009 | Chung | 370/241.1 |
| 2009/0204864 A1 | 8/2009 | Ohta et al. | |
| 2009/0238107 A1* | 9/2009 | Li et al. | 370/312 |

FOREIGN PATENT DOCUMENTS

| | | |
|---|---|---|
| JP | 2005-109570 | 4/2005 |
| JP | 2006-166081 | 6/2006 |
| JP | 2007-228377 A | 9/2007 |
| JP | 2007-535858 A | 12/2007 |
| JP | 2008-11314 A | 1/2008 |
| JP | 2008-77232 A | 4/2008 |
| WO | 2005/112490 | 11/2005 |
| WO | WO 2008/050453 A1 | 5/2008 |

OTHER PUBLICATIONS

Japanese Office Action mailed Jun. 5, 2012 for corresponding Japanese Application No. 2008-222476, with English-language translation.
Japanese Office Action mailed Oct. 9, 2012 for corresponding Japanese Application No. 2008-222476, with Partial English-language Translation.

* cited by examiner

*Primary Examiner* — Ian N Moore
*Assistant Examiner* — Brian T Le
(74) *Attorney, Agent, or Firm* — Fujitsu Patent Center

(57) ABSTRACT

A base station includes a determining unit that determines whether a competition occurs between an identifier of a first service flow established with respect to a mobile station and an identifier of a second service flow which is requested to newly establish with respect to the mobile station; a changing unit that changes the identifier of the first service flow or the identifier of the second service flow, when the determining unit determines that the competition of the identifiers occurs; and an establishing unit that establishes the second service flow by using the identifier of the second service flow with the competition being eliminated against the first service flow through the change by the changing unit.

10 Claims, 17 Drawing Sheets

FIG.4
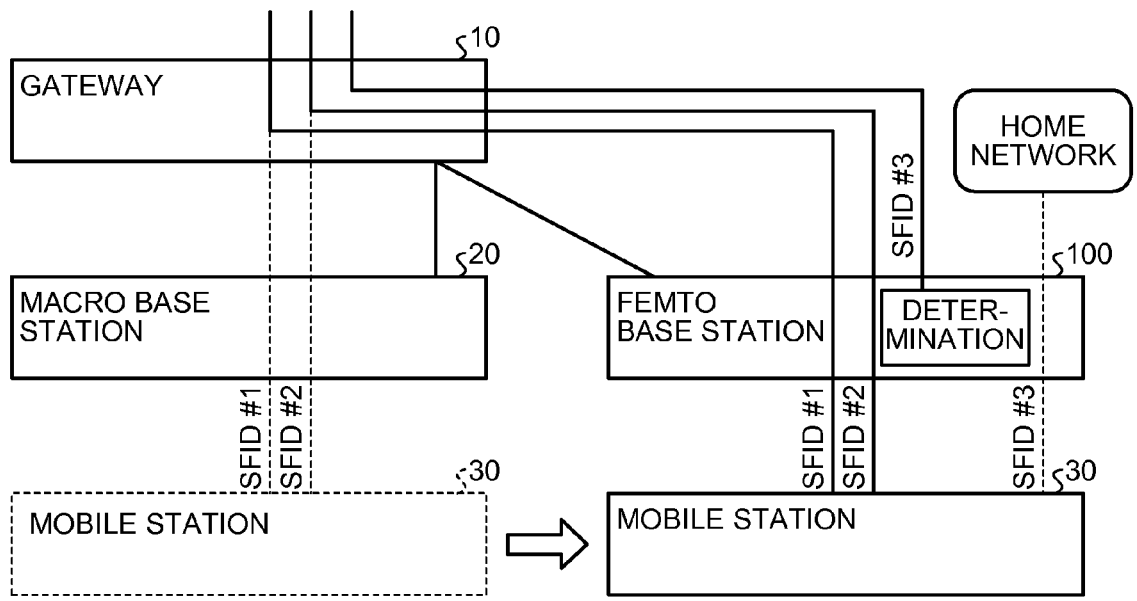
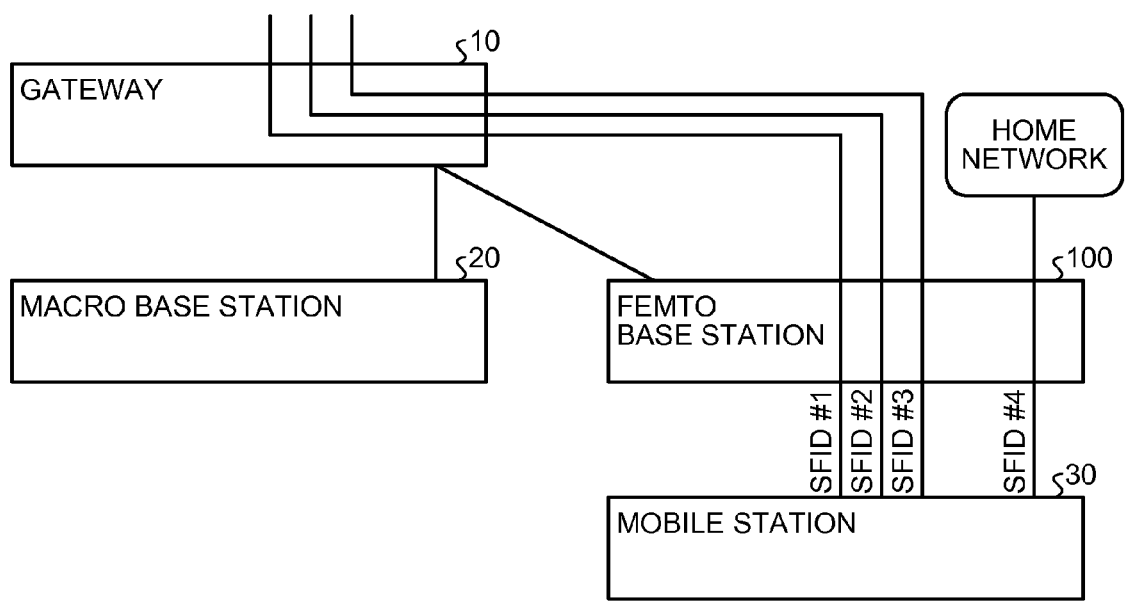

FIG.6

| MOBILE STATION ID | ESTABLISHED SFID | TYPE | CONVERTED SFID |
|---|---|---|---|
| 30-1 | SFID #1 | ASN·HIGH PRIORITY | - |
| | SFID #2 | ASN·LOW PRIORITY | - |
| | SFID #3 | HOME NETWORK | - |
| | SFID #3 | ASN·MIDDLE PRIORITY | SFID #4 |
| ⋮ | ⋮ | ⋮ | ⋮ |

FIG.8
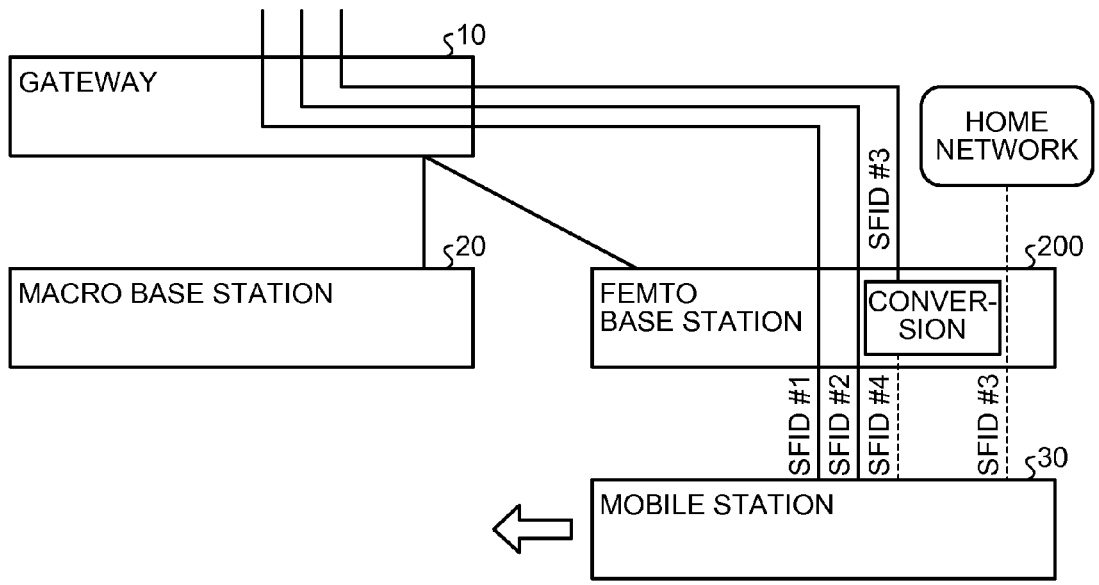
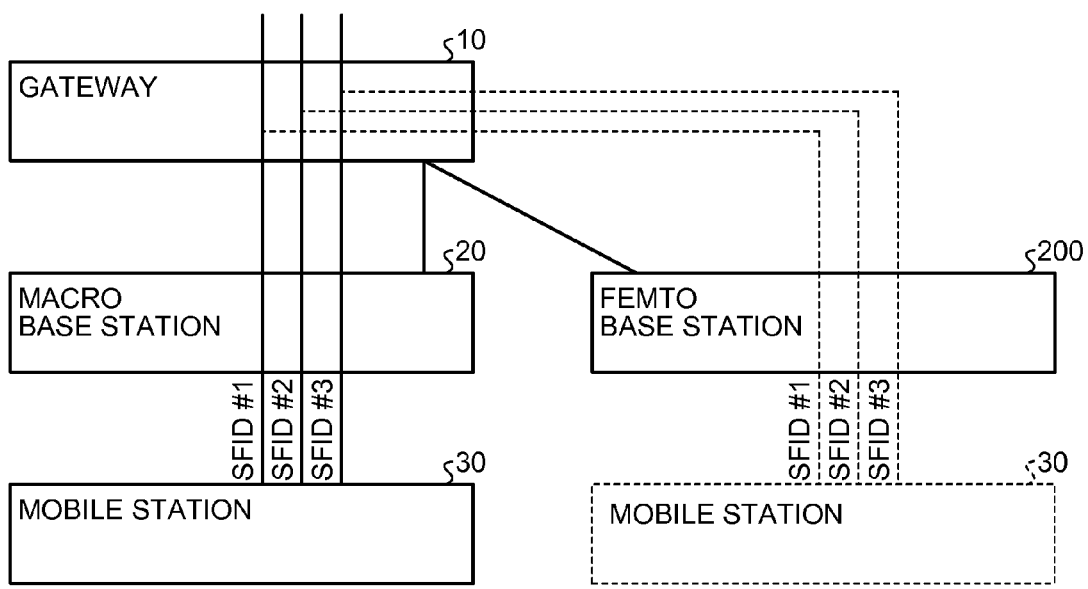

BASE STATION AND SERVICE FLOW ESTABLISHMENT METHOD

CROSS-REFERENCE TO RELATED APPLICATION(S)

This application is based upon and claims the benefit of priority of the prior Japanese Patent Application No. 2008-222476, filed on Aug. 29, 2008, the entire contents of which are incorporated herein by reference.

FIELD

The embodiments discussed herein are directed to a base station and service flow establishment method.

BACKGROUND

In recent years, the Institute of Electrical and Electronic Engineers (IEEE) is promoting standardization for the wireless communication method called Worldwide Interoperability for Microwave Access (WiMAX). The WiMAX includes two standards: the IEEE 802.16d targeted for non-mobile subscriber stations and the IEEE 802.16e targeted for mobile subscriber stations (referred to as "mobile station" below). The IEEE 802.16m as the next-generation standard of the IEEE 802.16e is also being subjected to standardization.

A mobile station according to the IEEE 802.16e or the like makes wireless communication with a macro base station arranged on a wired network called Access Service Network (ASN). In other words, the macro base station makes wireless communication with mobile stations located within a coverage within which a radio wave transmitted from the base station can reach (referred to as "macro cell" below). Generally, the macro base station is large-scaled and installed outdoors, and the macro cell is relatively large, too. Thus, if the macro base station is installed, the wireless communication is enabled within a relatively large coverage, but satisfactory communication quality cannot be obtained in a place where a radio wave cannot easily reach such as inside a building.

Thus, it is considered that a smaller-sized femto base station than the macro base station is introduced in the WiMAX. The femto base station is installed indoors such as inside a home, and a coverage within which a transmitted radio wave can reach (referred to as "femto cell" below) is relatively small.

In the communication system in which the two kinds of base stations such as the macro base station and the femto base station are installed, a handover across different kinds of base stations may occur. That is, when a mobile station being communicating within the macro cell moves into the femto cell, the communication party of the mobile station is switched from the macro base station to the femto base station.

At the time of the handover across the macro base station and the femto base station, a service flow established between the mobile station and the base station as handover source is taken over to the base station as handover destination, similarly to a handover between the base stations of the same type. Thus, the mobile station can continue the wireless communication by using the same service flow both after the handover and before the handover. The service flow is used for, for example, distinguishing data flows such as packets and is established per each Quality of Service (QoS) such as a bandwidth required for the data to be transmitted. Therefore, several service flows having different QoS may be established between a pair of mobile station and base station. Then, each service flow is assigned with a Service Flow Identifier (SFID) unique within one mobile station, and the SFID is assigned by an anchor Service Flow Authorization (anchor SFA) function of a gateway provided in the ASN.

Examples of the conventional techniques are disclosed in Japanese Laid-open Patent Publication No. 2006-166081 and International Publication Pamphlet No. WO 2005-112490.

An Internet Service Provider (ISP) network to which a subscriber's home at which a femto base station is installed subscribes is assumed to be utilized as a line for connecting the femto base station and the ASN. That is, a gateway in the ASN is wired-connected with the macro base station and is also connected with the femto base station via the ISP network. In this manner, the existing ISP network is utilized so that a new connection line does not need to be prepared for introducing the femto base station, thereby rapidly installing the femto base station at a low cost.

On the other hand, if a subscriber's home has already subscribed to the ISP network, a home network may have been formed inside the subscriber's home. That is, a plurality of devices such as server or personal computer inside the subscriber's home may have been connected to a router for connecting to the ISP network. In this case, the femto base station to be newly installed inside the subscriber's home will share one router with the home network. Thus, the femto base station is connected to the gateway in the ASN via the router and the ISP network and is also connected to the home network via the router.

Since the femto base station is connected to the home network, a service flow by which the mobile station within the femto cell accesses the home network may be established. In other words, the femto base station and the mobile station may add a new home network service flow, and the mobile station may exchange data with a device within the home network. At this time, the femto base station assigns an unused SFID to the newly-established home network service flow. Specifically, the femto base station confirms the SFID already assigned to the mobile station by the gateway in the ASN, and assigns an SFID other than the assigned SFID to the home network service flow.

However, when the femto base station assigns an SFID to the service flow, since the anchor SFA function of the gateway in the ASN does not involve the assignment of the SFID by the femto base station, a competition of SFIDs may occur. In other words, when the gateway in the ASN assigns an SFID to a newer service flow after the femto base station assigns an SFID to the home network service flow, the same SFID as assigned to the home network service flow may be assigned to the newer service flow.

In addition, since the gateway in the ASN cannot grasp even an address of each device used within the home network, the gateway cannot recognize the service flow established for the home network and cannot accurately set a rule for classifying the packets to each service flow depending on the QoS.

SUMMARY

According to an aspect of the invention, a base station includes a determining unit that determines whether a competition occurs between an identifier of a first service flow established with respect to a mobile station and an identifier of a second service flow which is requested to newly establish with respect to the mobile station; a changing unit that changes the identifier of the first service flow or the identifier of the second service flow, when the determining unit determines that the competition of the identifiers occurs; and an establishing unit that establishes the second service flow by using the identifier of the second service flow with the competition being eliminated against the first service flow through the change by the changing unit.

According to another aspect of an embodiment, a base station includes an establishing unit that establishes a service flow to be used for communicating with a mobile station; and a preventing unit that prevents establishment of a service flow whose identifier is the same as of the service flow established by the establishing unit from being requested by a different higher device from the mobile station.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

FIG. 4 is a schematic diagram of a service flow establishment according to the first embodiment;

FIG. 6 is a diagram of a specific example of an established SF storage unit according to the second embodiment;

FIG. 8 is a schematic diagram of a service flow establishment according to the second embodiment;

DESCRIPTION OF EMBODIMENT(S)

Embodiments according to the present invention will be below explained in detail with reference to the drawings. In the following, a communication system employing the WiMAX is exemplified for explanation. However, the present invention is applicable to a communication system employing a wireless communication method other than the WiMAX.

[a] First Embodiment

Figure 1:
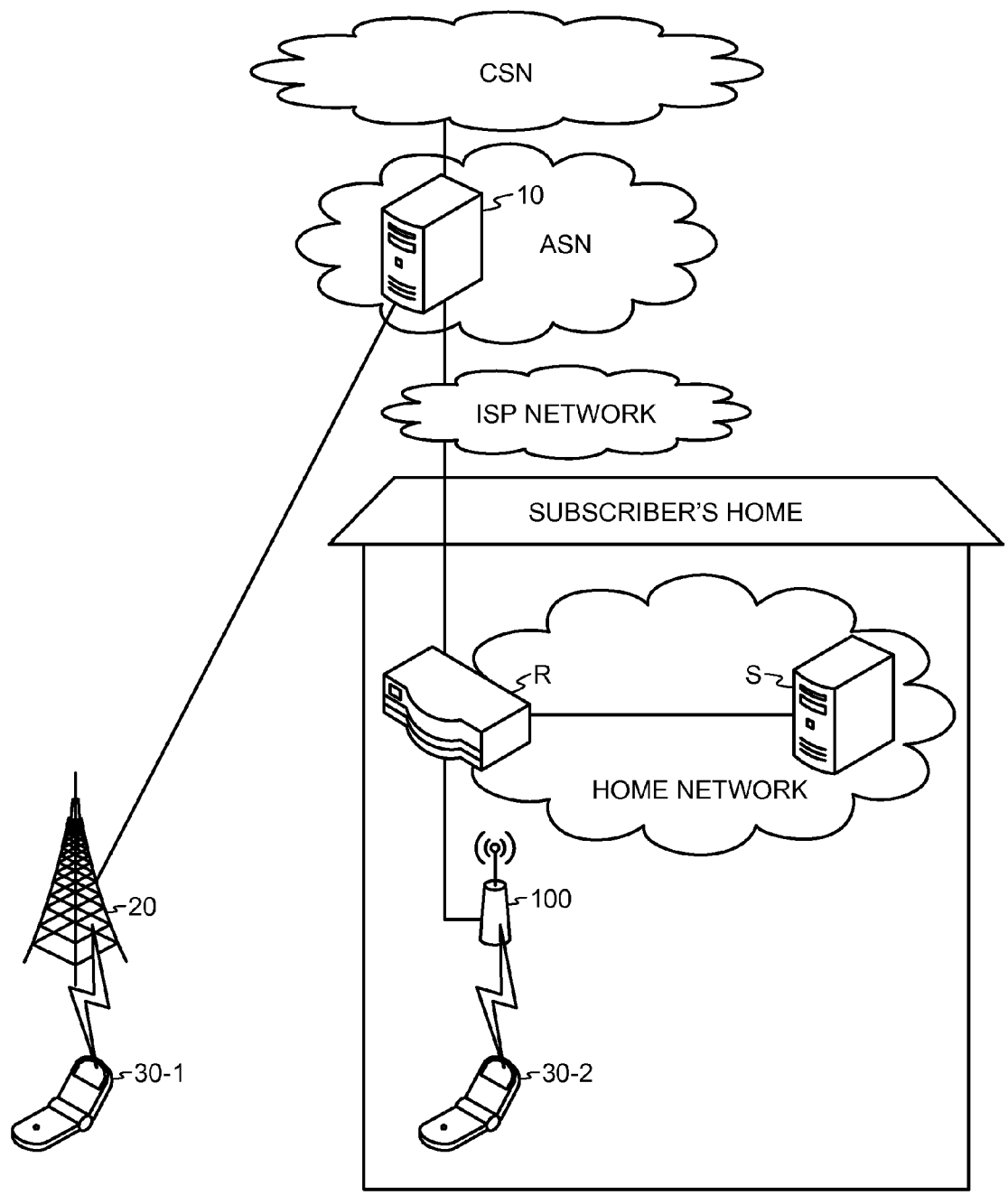
FIG. 1 is a diagram of a structure of a communication system according to a first embodiment.

FIG. 1 is a diagram of a structure of a communication system according to a first embodiment. As depicted in FIG. 1, the communication system according to the present embodiment includes a Connectivity Service Network (CSN) that provides an interconnection function with a network such as the Internet, and an Access Service Network (ASN) that accommodates a gateway 10 and a macro base station 20. The gateway 10 is connected to the macro base station 20 and is also connected to a router R at a subscriber's home via an Internet Service Provider (ISP) network. The router R forms a home network having a server S and the like, and is connected to a femto base station 100. Although the gateway 10 is connected only to one macro base station 20 and one router R in FIG. 1, the gateway 10 may be connected to a plurality of macro base stations and a plurality of routers.

The macro base station 20 establishes a service flow with respect to a mobile station 30-1 within a macro cell for making wireless communication. At this time, the gateway 10 in the ASN assigns an SFID to the service flow between the macro base station 20 and the mobile station 30-1 and requests the macro base station 20 to add a service flow with the assigned SFID. The macro base station 20 uses the SFID assigned by the gateway 10 to establish the service flow requested to add with respect to the mobile station 30-1.

Further, the femto base station 100 establishes a service flow with respect to a mobile station 30-2 within the femto cell (here, within a subscriber's home) for making wireless communication. At this time, the gateway 10 in the ASN assigns an SFID to the service flow between the femto base station 100 and the mobile station 30-2, and requests the femto base station 100 to add a service flow with the assigned SFID. The femto base station 100 uses the SFID assigned by the gateway 10 to establish the service flow requested to add with respect to the mobile station 30-2. Furthermore, when a home network service flow is established, the femto base station 100 assigns an SFID other than the SFID assigned by the gateway 10 in the ASN to the home network service flow (does not need to request the gateway 10 to assign an SFID), and then establishes the home network service flow with respect to the mobile station 30-2. A structure and operation of the femto base station 100 will be below explained in detail.

The mobile stations 30-1 and 30-2 make wireless communication with the macro base station 20 or the femto base station 100. At this time, the mobile stations 30-1 and 30-2 make wireless communication with the macro base station 20 within the macro cell thereof, and makes wireless communication with the femto base station 100 within the femto cell thereof. When the femto cell is contained in the macro cell, the mobile stations 30-1 and 30-2 preferentially select the femto base station as communication party. Then, when the mobile stations 30-1 and 30-2 moves across the boundary between the macro cell and the femto cell during communication, the mobile stations perform handover for switching a base station as communication party.

Figure 2:
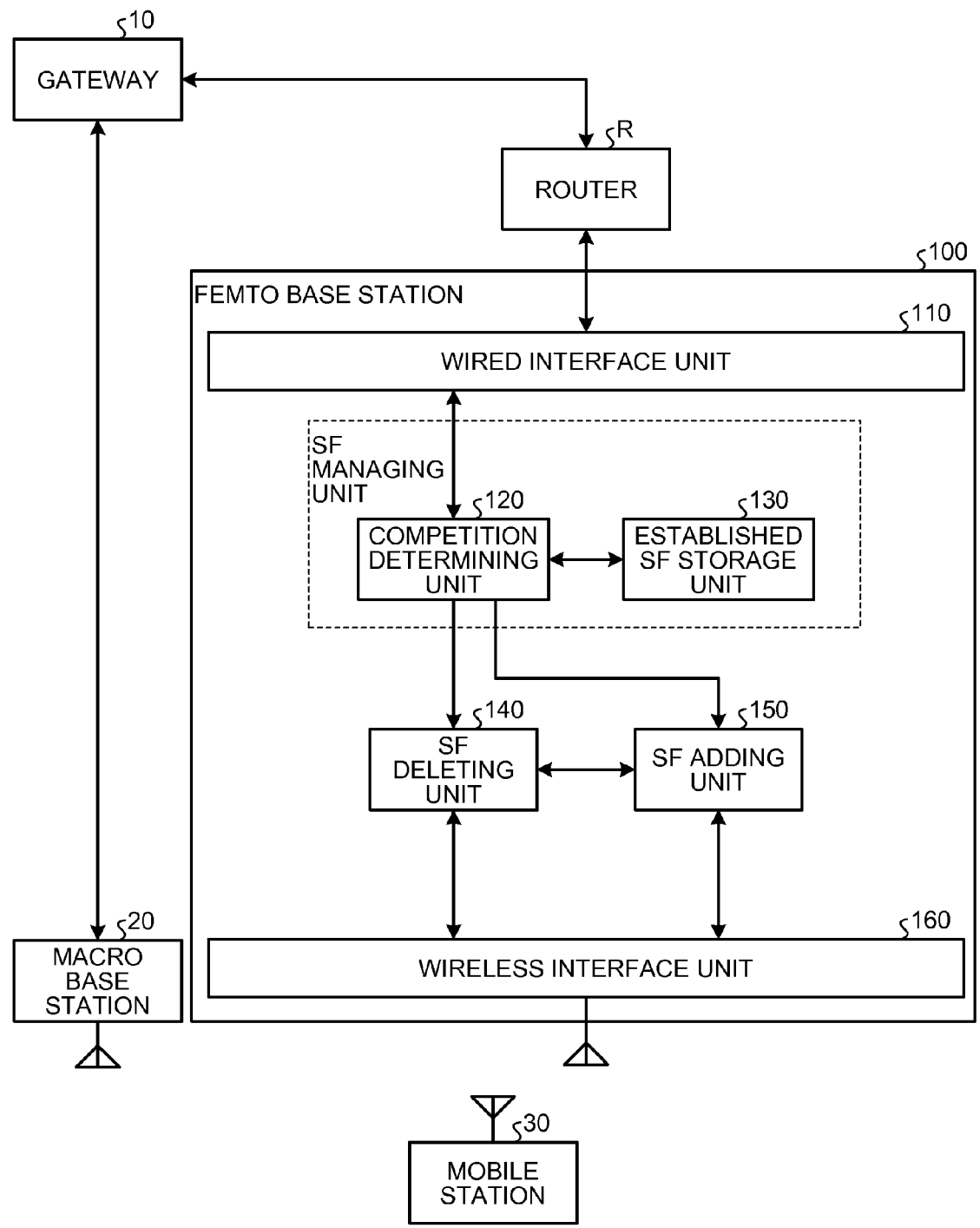
FIG. 2 is a block diagram of a structure of essential parts of a femto base station according to the first embodiment.

FIG. 2 is a block diagram of a structure of essential parts of the femto base station 100 according to the present embodiment. In this drawing, the gateway 10, the macro base station 20, the router R and the mobile station 30 are also illustrated together. The femto base station 100 depicted in FIG. 2 has a wired interface unit 110, a competition determining unit 120, an established service flow storage unit (denoted as "established SF storage unit" below) 130, a service flow deleting unit (denoted as "SF deleting unit" below) 140, a service flow adding unit (denoted as "SF adding unit" below) 150 and a wireless interface unit 160.

The wired interface unit 110 is wired-connected with the gateway 10 in the ASN via the router R and the ISP network (not depicted). The wired interface unit 110 exchanges data with the gateway 10. Specifically, the wired interface unit 110 receives a service flow addition request including an SFID of the ASN service flow to be newly established from the gateway 10 or transmits a response to the service flow addition request to the gateway 10.

The competition determining unit 120 determines whether a competition of SFIDs occurs when the service flow addition request is received by the wired interface unit 110. Specifically, the competition determining unit 120 acquires the SFID of the established service flow stored in the established SF storage unit 130 and determines whether the acquired SFID overlaps with the SFID contained in the service flow addition request. The competition determining unit 120 determines that the competition of the SFIDs occurs when the SFIDs overlap, and determines that the competition of the SFIDs does not occur when the SFIDs do not overlap. Since the established SF storage unit 130 stores therein the SFID of the home network service flow which the gateway 10 does not involves, the SFID of the service flow may overlap with the SFID contained in the service flow addition request if the home network service flow has been established.

When the competition determining unit 120 determines that the competition of the SFIDs occurs, the competition determining unit 120 instructs the SF deleting unit 140 to delete the established service flow (such as home network service flow) to which the competitive SFID is assigned, and notifies the SF adding unit 150 of the SFID to be newly assigned to the service flow to be deleted. At this time, the competition determining unit 120 notifies the SF adding unit 150 of an unused SFID other than the SFID of the established service flow and the competitive SFID. That is, the competition determining unit 120 changes the SFID of the service flow (such as home network service flow) whose SFID overlaps with the SFID of the ASN service flow to be added by means of the instruction to the SF deleting unit 140 and the SFID adding unit 150. The competition determining unit 120 notifies the SF adding unit 150 of the SFID contained in the service flow addition request along with the information on the service flow to be added.

On the other hand, when the competition determining unit 120 determines that the competition of SFIDs does not occur, the unit notifies the SF adding unit 150 of the SFID contained in the service flow addition request along with the information on the ASN service flow to be added.

The established SF storage unit 130 has stored therein the SFID of the service flow established between the femto base station 100 and the mobile station for each mobile station. Specifically, when the wired interface unit 110 receives the service flow addition request, the established SF storage unit 130 stores therein the information on the service flow to be added and the SFID for each mobile station. Further, when the competition determining unit 120 determines that the competition of SFIDs occurs, the established SF storage unit 130 deletes the SFID of the service flow which is instructed to delete to the SF deleting unit 140 and stores again the SFID to be newly assigned by the competition determining unit 120. The competition determining unit 120 and the established SF storage unit 130 form a service flow managing unit (SF managing unit) according to the present embodiment.

The SF deleting unit 140 deletes, via the wireless interface unit 160, the service flow which is instructed to delete by the competition determining unit 120. In other words, the SF deleting unit 140 deletes the established service flow among the two service flows for which the competition of SFIDs is determined to occur. As described above, since the SFID of the service flow to be added is competitive mainly with the SFID of the home network service flow, the SF deleting unit 140 mainly deletes the home network service flow. At this time, if the home network service flow is simply deleted, the service flow is temporarily interrupted. Thus, the SF deleting unit 140 may delete the service flow after being notified from the SF adding unit 150 of the fact that the same service flow as the service flow to be deleted is added again. Then, the SF deleting unit 140 may notify the SF adding unit 150 of the fact that the deletion of the service flow has been completed.

The SF adding unit 150 newly establishes the service flow having the SFID notified from the competition determining unit 120 via the wireless interface unit 160. That is, when it is determined that the competition of the SFIDs occurs, the SF adding unit 150 assigns a different SFID from that before the deletion by the SF deleting unit 140 and establishes the same service flow as the service flow to be deleted. Further, the SF adding unit 150 newly establishes the ASN service flow corresponding to the service flow addition request after the service flow is deleted by the SF deleting unit 140. On the other hand, when the competition of the SFIDs does not occur, the SF adding unit 150 newly establishes the ASN service flow corresponding to the service flow addition request.

When it is determined that the competition of the SFIDs occurs, the SF adding unit 150 performs the addition of the same service flow as the service flow to be deleted, and then notifies the SF deleting unit 140 of the fact that the addition has been completed. Then, the SFID adding unit 150 adds the ASN service flow corresponding to the service flow addition request after being notified by the SF deleting unit 140 of the fact that the deletion of the service flow has been completed. The addition and deletion of the service flow is performed in the above order, thereby preventing the service flows having the same SFID from existing at the same time.

The wireless interface unit 160 makes wireless communication with the mobile station 30 via an antenna. Specifically, the wireless interface unit 160 exchanges messages with the mobile station 30 in the processes of addition and deletion of the service flow.

Figure 3:
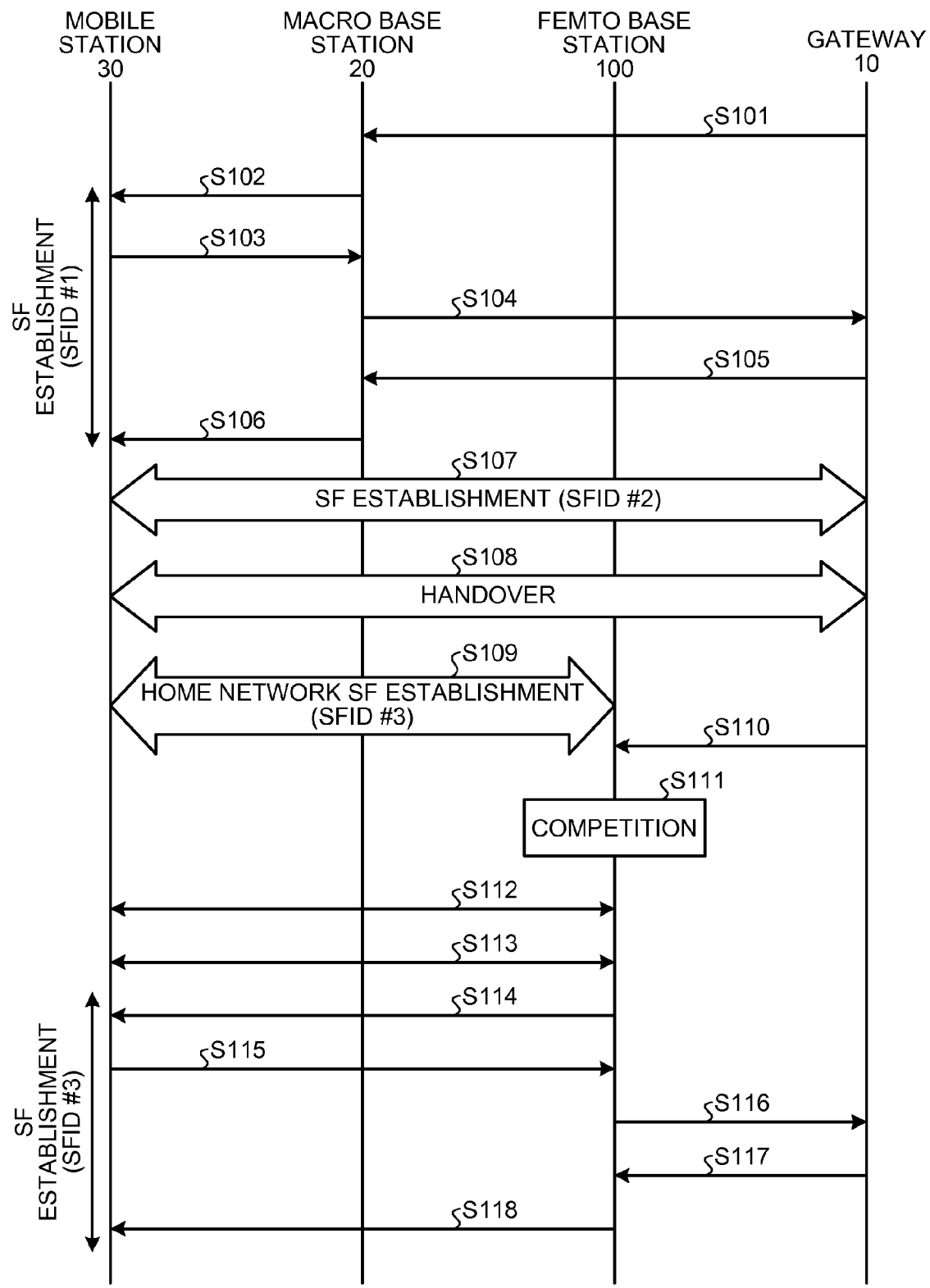
FIG. 3 is a sequence diagram of a service flow establishment method according to the first embodiment.

Then, a service flow establishment method in the communication system including the femto base station 100 configured as described above will be explained with reference to the sequence diagram depicted in FIG. 3. In the following, there will be explained a case in which the mobile station 30 moves from the macro cell of the macro base station 20 to the femto cell of the femto base station 100 for hands over. More specifically, there will be explained a case in which after the two service flows having SFID #1 and SFID #2 are established between the mobile station 30 and the macro base station 20, the mobile station 30 hands over and a new service flow is established between the mobile station 30 and the femto base station 100.

When the service flow is established between the mobile station 30 and the macro base station 20, an SFID to be assigned to the service flow is determined and the service flow addition request containing the determined SFID is transmitted by the gateway 10 to the macro base station 20 (step S101). It is assumed herein that the service flow addition request for SFID #1 is transmitted.

When the service flow addition request is received, a wireless link addition request for requesting to add a wireless link corresponding to the service flow is transmitted to the mobile station 30 by the macro base station 20 (step S102). The mobile station 30 which has received the wireless link addition request ensures a bandwidth for the requested wireless link and transmits a response to the wireless link addition request to the macro base station 20 (step S103). Then, when a response to the service flow addition request is transmitted to the gateway 10 by the macro base station 20 (step S104), ACK (acknowledgement) to the response is returned from the gateway 10 (step S105). When the ACK from the gateway 10 is received by the macro base station 20, the ACK is also transmitted from the macro base station 20 to the mobile station 30 (step S106).

With the above processes, the wireless link corresponding to the service flow having SFID #1 is established between the mobile station 30 and the macro base station 20 so that the service flow having SFID #1 is finally established. Further, since the service flow is added in response to the service flow addition request from the gateway 10, the anchor SFA function of the gateway 10 grasps that the service flow having SFID #1 has been established.

Thereafter, similarly to the establishment of the service flow having SFID #1 described above, a service flow having SFID #2 is established between the mobile station 30 and the macro base station 20 (step S107). Since the service flow having SFID #2 is also added in response to the service flow addition request from the gateway 10, the anchor SFA function of the gateway 10 grasps that the service flow having SFID #2 has been established.

In this state, when the mobile station 30 moves to the femto cell of the femto base station 100, the handover for switching the communication party of the mobile station 30 to the femto base station 100 is performed (step S108). Specifically, the service flows having SFID #1 and SFID #2 already established in the macro base station 20 are handed over to the femto base station 100. With this, the established SF storage unit 130 in the femto base station 100 stores therein the information on the service flows having SFID #1 and SFID #2 in association with the mobile station 30.

Here, since the femto base station 100 is connected to the home network via the router R, the home network service flow may be requested to add between the femto base station 100 and the mobile station 30. In this case, a message for establishing the home network service flow is exchanged between the wireless interface unit 160 in the femto base station 100 and the mobile station 30, and the home network service flow is newly added (step S109).

Since the home network service flow is added by the initiative of the femto base station 100, the SFID is assigned by the femto base station. Here, since SFID #1 and SFID #2 have been assigned to the established service flows, SFID #3 is assigned to the home network service flow. Then, the established SF storage unit 130 in the femto base station 100 stores therein the information on the service flow having SFID #3. Since the home network service flow is effective only between the femto base station 100 and the mobile station 30, the anchor SFA function in the gateway 10 does not grasp that the service flow having SFID #3 has been established.

Thereafter, similarly to the transmission of the service flow addition request for SFID #1 and SFID #2 from the gateway 10 to the macro base station 20, the ASN service flow addition request is transmitted from the gateway 10 to the femto base station 100 (step S110). At this time, since the anchor SFA function in the gateway 10 does not grasp that the home network service flow having SFID #3 has been already established in the femto base station 100, the service flow addition request for SFID #3 is newly transmitted. With this, the competition of the SFIDs occurs in the femto base station 100 (step S111).

Specifically, the service flow addition request transmitted from the gateway 10 is received by the wired interface unit 110 in the femto base station 100 and is output to the competition determining unit 120. Then, the competition determining unit 120 acquires the SFID of the service flow established with respect to the mobile station 30 from the established SF storage unit 130. SFID #1 and SFID #2 of the ASN service flows handed over from the macro base station 20 at the time of the handover of the mobile station 30 and SFID #3 of the home network service flow are acquired from the established SF storage unit 130. The competition determining unit 120 determines whether the same SFID as contained in the service flow addition request is present in the acquired SFIDs. As a result, since SFID #3 of the home network service flow matches with SFID #3 contained in the service flow addition request, the competition determining unit 120 determines that the competition of the SFIDs occurs.

When it is determined that the competition of the SFIDs occurs, the competition determining unit 120 outputs to the SF deleting unit 140 an instruction of deleting the established service flow among the two service flows whose SFIDs are competitive. At the same time, the competition determining unit 120 notifies the SF adding unit 150 of the SFID to be newly assigned to the same service flow as the deletion-instructed service flow and the SFID contained in the service flow addition request. In other words, the competition determining unit 120 determines the SFID to be newly assigned to the home network service flow as an unused SFID #4, for example, and notifies the SF adding unit 150 of the determined SFID #4 and the SFID #3 contained in the service flow addition request from the gateway 10.

When SFID #4 and SFID #3 are notified to the SF adding unit 150, the SF adding unit 150 performs a processing of establishing the same service flow as the home network service flow to be deleted. Specifically, the SF adding unit 150 exchanges messages such as wireless link addition request with the mobile station 30 via the wireless interface unit 160, and establishes the same service flow as the service flow to be deleted (step S112). The service flow is assigned with SFID #4 notified from the competition determining unit 120. With this, the home network service flow assigned with SFID #4 is finally established. Then, the fact that the service flow having SFID #4 is added is notified from the SF adding unit 150 to the SF deleting unit 140.

When the SF deleting unit 140 is notified of the fact that the service flow having SFID #4 is added, the SF deleting unit 140 exchanges messages such as wireless link deletion request with the mobile station 30 via the wireless interface unit 160 and deletes the home network service flow assigned with SFID #3 (step S113). With this, the home network service flow whose SFID is competitive is finally deleted. Then, the fact that the service flow having SFID #3 has been deleted is notified from the SF deleting unit 140 to the SF adding unit 150.

When the fact that the service flow having SFID #3 has been deleted is notified to the SF adding unit 150, the SF adding unit 150 exchanges messages such as wireless link addition request with the mobile station 30 via the wireless interface unit 160 and performs a processing of establishing the service flow corresponding to the service flow addition request from the gateway 10. The service flow is assigned with SFID #3 notified from the competition determining unit 120. The service flow assigned with SFID #3 is established by the similar processing as for the service flows having SFID #1 and SFID #2 in the macro base station 20.

Specifically, a wireless link addition request for requesting to add a wireless link corresponding to the service flow is transmitted to the mobile station 30 (step S114), and the mobile station 30 which has received the wireless link addition request ensures a bandwidth for the requested wireless link and transmits a response to the wireless link addition request to the femto base station 100 (step S115). When the response to the service flow addition request is transmitted to the gateway 10 by the wired interface unit 110 in the femto base station 100 (step S116), ACK to the response is returned from the gateway 10 (step S117). When the ACK from the gateway 10 is received by the wired interface unit 110, the ACK is transmitted from the wireless interface unit 160 also to the mobile station 30 (step S118).

As described above, in the present embodiment, when the SFID of the home network service flow is competitive with the SFID of the service flow corresponding to the service flow addition request, the home network service flow assigned with a new SFID is first established. Thereafter, the home network service flow whose SFID is competitive is deleted, and the service flow corresponding to the service flow addition request is finally added. Thus, it is possible to prevent the home network service flow from being temporarily interrupted and to eliminate the competition of the SFIDs.

Next, a processing during the occurrence of the SFIDs competition according to the present embodiment will be specifically explained with reference to FIG. 4.

As depicted in the upper part of FIG. 4, while the mobile station 30 is making wireless communication with the macro base station 20, the service flows having SFID #1 and SFID #2 are established and the gateway 10 grasps that the mobile station 30 uses the service flows having SFID #1 and SFID #2. Then, even when the mobile station 30 hands over to start the wireless communication with the femto base station 100, the service flows having SFID #1 and SFID #2 are continued and the gateway 10 grasps that the mobile station 30 subsequently uses the service flows having SFID #1 and SFID #2.

At this time, since the femto base station 100 is connected also to the home network, the home network service flow may be established between the femto base station 100 and the mobile station 30. Since this service flow is effective only within the femto cell of the femto base station 100, the SFID of the service flow is uniquely determined by the femto base station 100. Since SFID #1 and SFID #2 have been already used, the unused SFID #3 is assumed as the SFID of the home network service flow. In the femto base station 100, SFID #3 is grasped as the SFID assigned to the service flow with respect to the mobile station 30, but in the gateway 10, SFID #3 is not grasped as being used.

Therefore, as depicted in the upper part of FIG. 4, when a new service flow addition request is transmitted from the gateway 10, the service flow having SFID #3 is requested to add by the service flow addition request. When the service flow addition request is received by the femto base station 100, the competition determining unit 120 determines whether the competition of the SFIDs occurs, and here determines that the competition of SFIDs #3 occurs.

The same service flow assigned with SFID #4 is added by the SF adding unit 150 instead of the home network service flow assigned with SFID #3. The home network service flow assigned with SFID #3 is deleted by the SF deleting unit 140. Thus, the SFID can be changed from SFID #3 to SFID #4 without interruption of the home network service flow.

Since the service flow having SFID #3 is no longer present between the femto base station 100 and the mobile station 30, the service flow assigned with SFID #3 corresponding to the service flow addition request is added by the SF adding unit 150. Thus, as depicted in the lower part of FIG. 4, the ASN service flows assigned with the SFIDs #1 to #3 and the home network service flow assigned with SFID #4 are established. These service flows are assigned with SFIDs unique within the mobile station 30 and the competition of SFIDs is eliminated.

As described above, according to the present embodiment, when it is determined that the competition of the SFIDs between the service flow requested to add and the established service flow occurs in the femto base station, the SFID of the established service flow is changed into an unused new SFID to add a new service flow. Thus, even when the femto base station uniquely assigns an SFID to the home network service flow, the competition of the SFIDs can be prevented. Further, since the femto base station to be newly introduced eliminates the competition of the SFIDs, the processing in the existing gateway and the like do not need to be changed, thereby preventing an increase in cost.

[b] Second Embodiment

A second embodiment according to the present invention is characterized in that an SFID is converted in the femto base station to eliminate the competition of SFIDs, and when the mobile station hands over from the femto cell to the macro cell, a service flow is handed over to the macro base station after the service flow whose SFID has been converted is reestablished in the femto base station as handover source.

Figure 5:
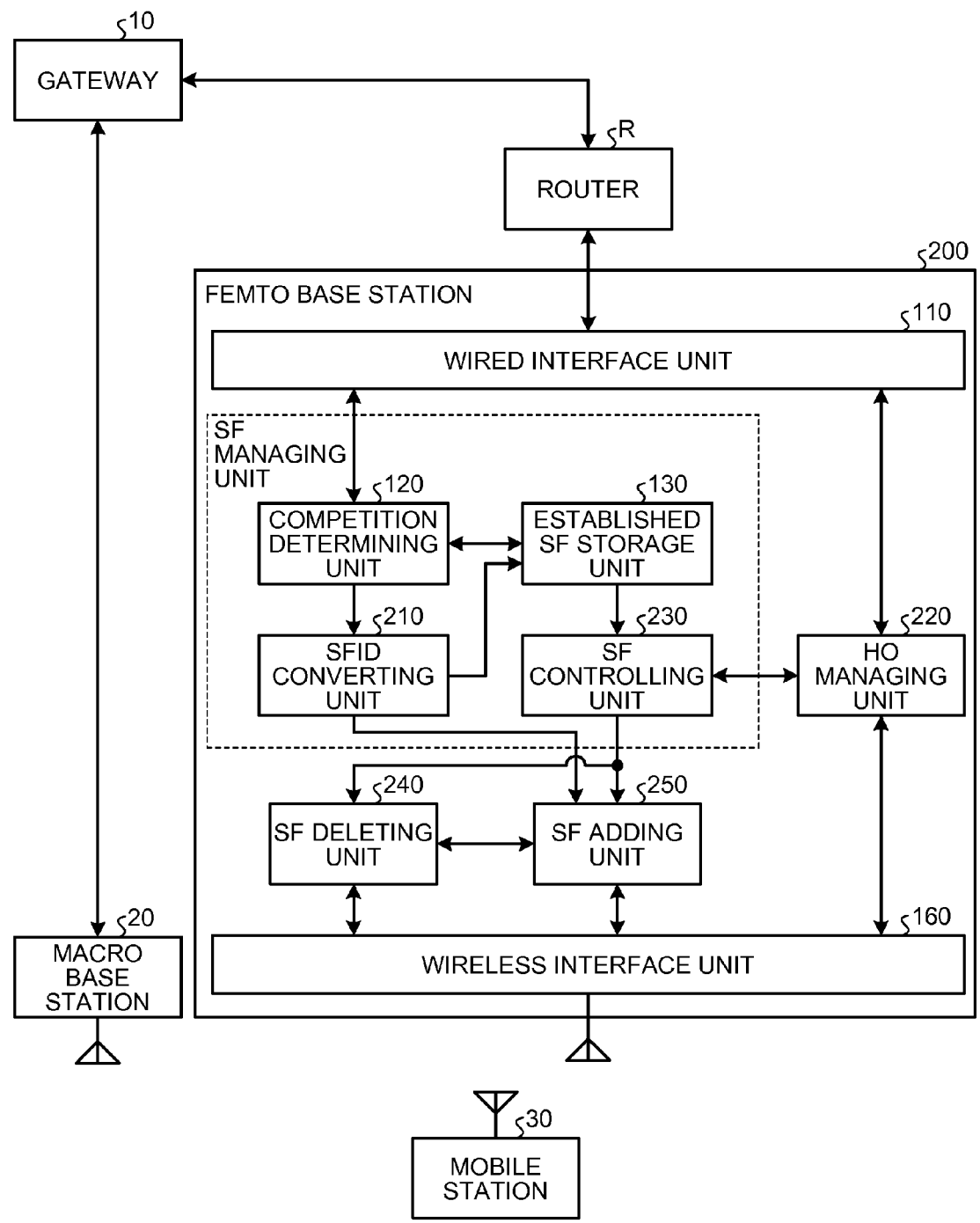
FIG. 5 is a block diagram of a structure of essential parts of a femto base station according to a second embodiment.

FIG. 5 is a block diagram of a structure of essential parts of a femto base station 200 according to the present embodiment. In FIG. 5, the same parts as those of FIG. 2 are designated by the same reference numerals, and the explanation thereof will be omitted. The femto base station 200 depicted in FIG. 5 has the wired interface unit 110, the competition determining unit 120, the established SF storage unit 130, an SFID converting unit 210, a handover managing unit (denoted as "HO managing unit" below) 220, a service flow controlling unit (denoted as "SF controlling unit" below) 230, an SF deleting unit 240, an SF adding unit 250 and the wireless interface unit 160.

When the competition determining unit 120 determines that the competition of SFIDs occurs, the SFID converting unit 210 converts the SFID of the service flow corresponding to the service flow addition request to an unused SFID. Then, the SFID converting unit 210 stores the converted SFID and the unconverted SFID associated with each other in the established SF storage unit 130, and notifies the SF adding unit 250 of the converted SFID.

In the present embodiment, since the SFID converting unit 210 converts and registers the SFID contained in the service flow addition request from the gateway 10 into the established SF storage unit 130, the established SF storage unit 130 stores therein the converted SFID. In other words, as depicted in FIG. 6, for example, the unconverted SFID contained in the service flow addition request or the SFID assigned to the home network service flow is stored as the established SFID, and the SFID converted by the SFID converting unit 210 is stored as the converted SFID associated with the unconverted SFID contained in the service flow addition request.

In FIG. 6, a mobile station ID for identifying the mobile station 30 is assumed as "30-1", and a service flow's established SFID, a type of each service flow, and a converted SFID, which are used by the mobile station 30, are depicted therein. FIG. 6 depicts that, when the home network service flow is assigned with "SFID #3", and the service flow whose priority is middle, which is requested to add by the service flow addition request, is also assigned with "SFID #3", the converted SFID of the latter service flow has "SFID #4".

When the HO managing unit 220 detects that the mobile station 30 hands over to the macro cell of the macro base station 20, the unit exchanges a message such as handover request with the macro base station 20 via the wired interface unit 110. Further, the HO managing unit 220 notifies the SF controlling unit 230 of the fact that the mobile station 30 performs handover.

When the mobile station 30 performs handover, the SF controlling unit 230 refers to the established SF storage unit 130 to confirm whether the mobile station 30 uses the service flow having the converted SFID. Then, when the mobile station 30 uses the service flow having the converted SFID, the SF controlling unit 230 notifies the SF deleting unit 240 and the SF adding unit 250 of the unconverted SFID (established SFID) and the converted SFID of the relevant service. In other words, the SF controlling unit 230 notifies the SF deleting unit 240 and the SF adding unit 250 of the established SFID and the converted SFID of the service flow whose SFID is converted due to the competition with the home network service flow.

When the established SFID and the converted SFID are notified from the SF controlling unit 230, the SF deleting unit 240 deletes the service flows assigned with the established SFID and the converted SFID via the wireless interface unit 160. In other words, the SF deleting unit 240 deletes the service flow having the established SFID competitive with other service flow and also deletes the service flow having the converted SFID which has been converted for eliminating the competition with other service flow. That is, the SF deleting unit 240 deletes both the two service flows which are determined to be competitive with each other for the SFID. Therefore, in the case depicted in FIG. 6, the SF deletion unit 240 deletes the home network service flow corresponding to the established SFID "SFID #3" and also deletes the ASN service flow, whose priority is middle, corresponding to the converted SFID "SFID #4". Then, the SF deleting unit 240 notifies the SF adding unit 250 of the fact that the deletion of the service flows has been completed.

The SF adding unit 250 newly establishes the service flow having the converted SFID notified from the SFID converting unit 210 via the wireless interface unit 160. In other words, the SF adding unit 250 newly establishes the service flow whose SFID has been competitive with that of the established service flow as the service flow having the converted SFID.

Further, the SF adding unit 250 is notified of the established SFID and the converted SFID from the SF controlling unit 230, is notified from the SF deleting unit 240 of the fact that the deletion of the service flow has been completed, and then establishes the same service flow as the service flow having the converted SFID as the service flow having the established SFID via the wireless interface unit 160. In other words, in the case depicted in FIG. 6, for example, the SF adding unit 250 establishes the same service flow as the ASN service flow, whose priority is middle, corresponding to the converted SFID "SFID #4" and sets the SFID of the service flow to the "SFID #3" identical to the established SFID. With this, the service flow having SFID #3 becomes not the home network service flow but the ASN service flow whose priority is middle. In other words, the conversion of the SFID by the SFID converting unit 210 is returned to the origin so that the SFID grasped by the gateway 10 matches with the SFID of the actual service flow between the femto base station 200 and the mobile station 30.

Figure 7:
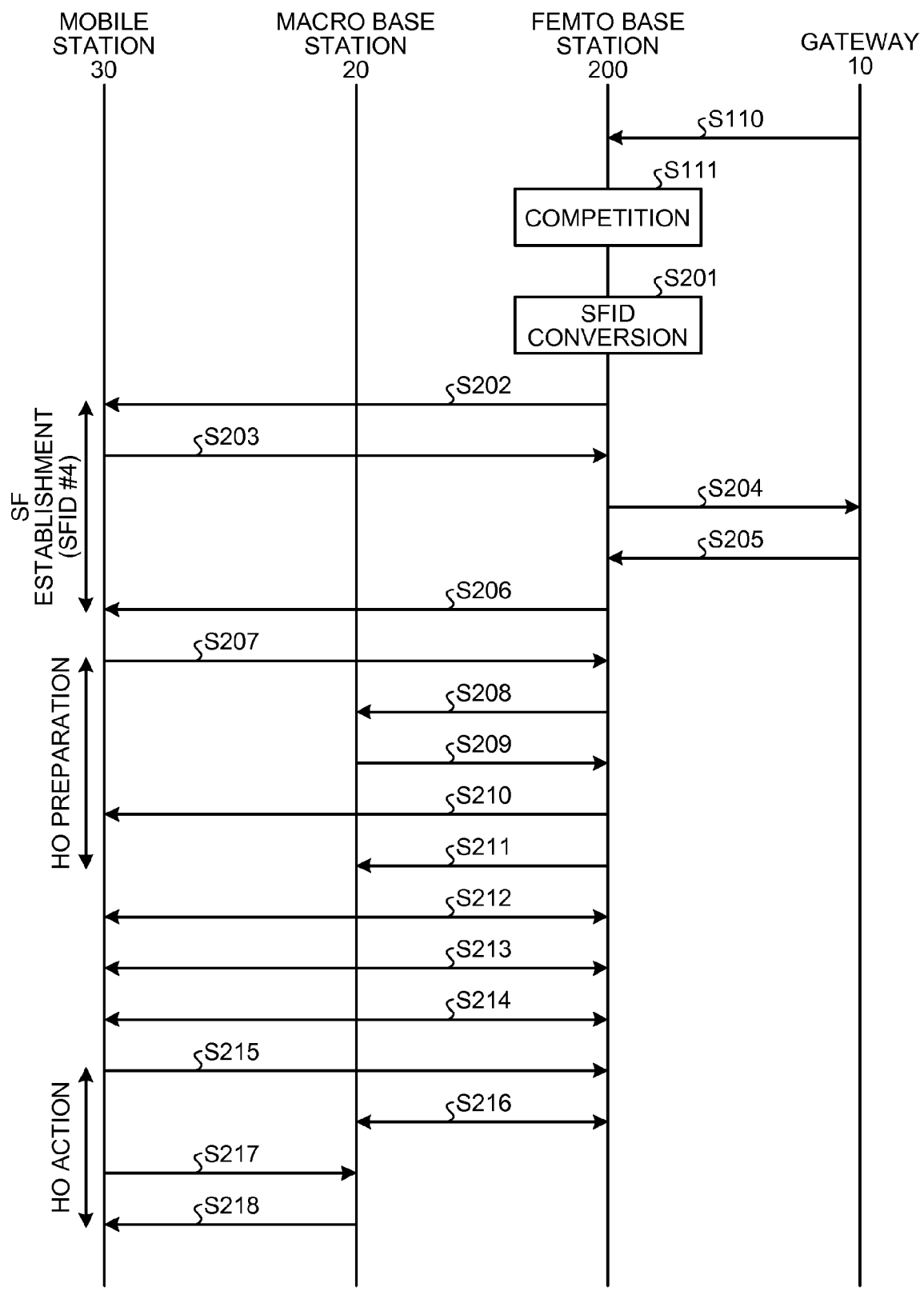
FIG. 7 is a sequence diagram of a service flow establishment method according to the second embodiment.

Next, a service flow establishment method in the communication system including the femto base station 200 configured as described above will be explained with reference to the sequence diagram depicted in FIG. 7. In FIG. 7, the same parts as those of FIG. 3 are designated by the same reference numerals, and the detailed explanation thereof will be omitted. In the following, there will be explained a case in which the mobile station 30 moves from the femto cell of the femto base station 200 to the macro cell of the macro base station 20 for handover. More specifically, there will be explained a case in which when the service flows having SFIDs #1 to #3 have been established between the mobile station 30 and the femto base station 200, the service flow having SFID #3 which is competitive is newly requested to add and then the mobile station 30 performs handover.

In the present embodiment, similarly to the first embodiment, the two service flows having SFID #1 and SFID #2 in response to the service flow addition request from the gateway 10 and the home network service flow having SFID #3 are established. In this state, when a new service flow addition request for SFID #3 is transmitted from the gateway 10 to the femto base station 200 (step S110), the competition determining unit 120 determines that the competition of SFIDs occurs (step S111).

The SFID which has been determined to be competitive is converted into an unused SFID by the SFID converting unit 210 (step S201). Since SFID #4 is unused, for example, the SFID converting unit 210 converts SFID #3 of the service flow corresponding to the service flow addition request into SFID #4, which is registered in the established SF storage unit 130. Further, the converted SFID #4 is notified to the SF adding unit 250 and the service flow having SFID #4 is established by the SF adding unit 250. The service flow is established with the similar processing to those of the service flows having SFID #1 and SFID #2.

In other words, a wireless link addition request for requesting to add a wireless link corresponding to the service flow is transmitted to the mobile station 30 (step S202), and the mobile station 30 which has received the wireless link addition request ensures a bandwidth for the requested wireless link and transmits a response to the wireless link addition request to the femto base station 200 (step S203). Then, the response to the service flow addition request is transmitted to the gateway 10 by the wired interface unit 110 in the femto base station 200 (step S204), and ACK to the response is returned from the gateway 10 (step S205). When the ACK from the gateway 10 is received by the wired interface unit 110, the ACK is transmitted from the wireless interface unit 160 also to the mobile station 30 (step S206).

Thus, the service flow having SFID #4 is added between the femto base station 200 and the mobile station 30, and the service flow is grasped as the service flow having SFID #3 in the gateway 10. Actually, the service flow having SFID #3 is for the home network, and is uniquely established by the femto base station 200. In the present embodiment, unlike the first embodiment, even when it is determined that the competition of SFIDs occurs, the SFID of the home network service flow does not need to be changed so that the communication utilizing the home network service flow is not interrupted.

Thereafter, when the mobile station 30 moves to the macro cell of the macro base station 20, a handover is performed. The handover is divided into two processing phases: preparation phase and action phase. The handover preparation phase is first started as follows. That is, when the mobile station 30 determines the macro base station 20 as the handover destination through the comparison of reception power or the like, the message indicating that the handover destination of the mobile station 30 is the macro base station 20 is transmitted to the femto base station 200 (step S207). When the message is received by the wireless interface unit 160 in the femto base station 200, the HO managing unit 220 transmits the handover request to the macro base station 20 (step S208). The macro base station 20 which has received the handover request prepares for the handover of the mobile station 30 and transmits the response to the handover request to the femto base station 200 (step S209). Upon receiving the response, a response to the message from the mobile station 30 is transmitted by the HO managing unit 220 in the femto base station 200 (step S210), and ACK to the response to the handover request is returned to the macro base station 20 (step S211).

When the handover preparation phase described above is started, the HO managing unit 220 notifies the SF controlling unit 230 of the fact that the mobile station 30 performs handover. Then, the SF controlling unit 230 confirms the SFID of the service flow stored in the established SF storage unit 130 and determines the presence of the service flow whose SFID has been converted. In this case, since the SFID of the home network service flow is SFID #3, the SFID of the service flow corresponding to the service flow addition request from the gateway 10 has been converted from SFID #3 to SFID #4. The SF controlling unit 230 acquires the established SFID "SFID #3" before the converting and the converted SFID "SFID #4" after the converting, and the established SFID and the converted SFID are notified to the SF deleting unit 240 and the SF adding unit 250.

When the established SFID and the converted SFID are notified to the SF deleting unit 240, the processing of deleting the service flows having the two SFIDs is performed by the SF deleting unit 240. Specifically, the SF deleting unit 240 exchanges the message such as wireless link deletion request with the mobile station 30 via the wireless interface unit 160, and deletes the home network service flow assigned with SFID #3 and the ASN service flow assigned with SFID #4 (steps S212, S213). With this, the two service flows whose SFIDs are competitive are finally deleted. Since the mobile station 30 hands over from the femto cell of the femto base station 200 to the macro cell of the macro base station 20, even when the service flow established between the mobile station 30 and the femto base station 200 is deleted, no problem is caused. When the service flow is deleted, the fact is notified from the SF deleting unit 240 to the SF adding unit 250.

When the fact that the service flows having SFID #3 and SFID #4 has been deleted is notified to the SF adding unit 250, the SF adding unit 250 exchanges the message such as wireless link addition request with the mobile station 30 via the wireless interface unit 160 and performs a processing of establishing the same service flow as the ASN service flow deleted by the SF deleting unit 240 (step S214). The service flow is assigned with the established SFID "SFID #3" notified from the SF controlling unit 230. That is, the SFID of the ASN service flow as a cause of the competition is changed from SFID #4 to SFID #3. The ASN service flow assigned with SFID #3 is established through the similar processing to those of the service flows having SFID #1 and SFID #2.

The three service flows assigned with SFID #1 to SFID #3 are established between the femto base station 200 and the mobile station 30 as grasped by the gateway 10 through the deletion and addition of the service flows described above. In this state, the following handover action phase is started. That is, when the message indicating that the mobile station 30 performs handover is transmitted to the femto base station 200 (step S215), the execution of handover is finally fixed between the femto base station 200 and the macro base station 20 (step S216). At this time, the service flows assigned with SFIDs #1 to #3 are handed over from the femto base station 200 to the macro base station 20. Then, when the mobile station 30 requests the macro base station 20 to transmit a known signal specific to the macro base station 20 (step S217), and the known signal is transmitted from the macro base station 20 (step S218), the wireless communication with the macro base station 20 is started by using the known signal.

With the above handover action phase, the mobile station 30 can complete the handover and continuously use all the ASN service flows used for communicating with the femto base station 200. The SFIDs of the service flows are SFIDs #1 to #3 and all the SFIDs match with the SFID grasped by the gateway 10 unlike during communication with the femto base station 200.

Next, a processing during the occurrence of the SFID competition according to the present embodiment will be specifically explained with reference to FIG. 8.

As depicted in the upper part of FIG. 8, while the mobile station 30 is making wireless communication with the femto base station 200, the ASN service flows having SFID #1 and SFID #2 and the home network service flow having SFID #3 are established and the ASN service flow is established whose SFID has been converted from SFID #3 to SFID #4 in the femto base station 200. Therefore, the gateway 10 grasps that the mobile station 30 uses the ASN service flows having SFIDs #1 to #3. When the mobile station 30 hands over to the macro cell of the macro base station 20, the home network service flow is deleted in the femto base station 200. Since the home network service flow is specific to the femto base station 200, even when it is deleted at the time of the handover of the mobile station 30, no problem is caused.

Since the home network service flow is deleted, the competition of SFIDs will not occur and the SFID of the ASN service flow does not need to be converted. Thus, the SFID of the ASN service flow, whose SFID has been converted, is returned to the unconverted SFID. That is, in the upper part of FIG. 8, the home network service flow having SFID #3 indicated by a dotted line in FIG. 8 is deleted and the ASN service flow whose SFID has been converted into SFID #4 is temporarily deleted to be reestablished as the service flow having SFID #3. With this, the ASN service flows having SFIDs #1 to #3 are established between the femto base station 200 and the mobile station 30 so that the SFIDs of these service flows match with the SFID grasped by the gateway 10.

Since the service flow is handed over from the femto base station 200 to the macro base station 20 when the mobile station 30 performs handover, the mobile station 30 can use the same service flow both before and after the handover. In other words, As depicted in the lower part of FIG. 8, the service flows having SFIDs #1 to #3 established between the femto base station 200 and the mobile station 30 are established also between the macro base station 200 and the mobile station 30 as they are.

As described above, according to the present embodiment, when it is determined that the competition of SFIDs of the service flow requested to add and the established service flow occurs in the femto base station, the SFID of the service flow requested to add is converted and the service flow having the converted SFID is established between the femto base station and the mobile station. Thus, even when the femto base station uniquely assigns the SFID to the home network service flow, the competition of SFIDs can be prevented. When the mobile station hands over, the femto base station returns the SFID of the service flow which has been established with the converted SFID to the unconverted SFID and takes over the service flow to the base station as the handover destination. Thus, even when the SFID has been converted in the femto base station, the service flow having appropriate SFID can be taken over to the base station as handover destination when the mobile station hands over.

Although there has been explained the case where the service flow is handed over in the handover action phase in the present embodiment, the service flow may be handed over in the handover preparation phase. In this case, the home network service flow has not been deleted, but the service flow can be appropriately handed over if the information stored in the established SF storage unit 130 is used. In other words, since the established SF storage unit 130 in the femto base station 200 has stored therein the SFID of the home network service flow and the unconverted and converted SFIDs of the ASN service flow, only the ASN service flow may be handed over to the base station as the handover destination by using the unconverted SFID.

[c] Third Embodiment

A third embodiment according to the present invention is characterized in that the SFID is converted inside the femto base station to eliminate the competition of SFIDs, and the service flow not associated with the conversion of the SFID is handed over to the macro base station as the handover destination when the mobile station hands over from the femto cell to the macro cell whereas the service flow associated with the conversion of the SFID is reestablished in the macro base station as the handover destination.

Figure 9:
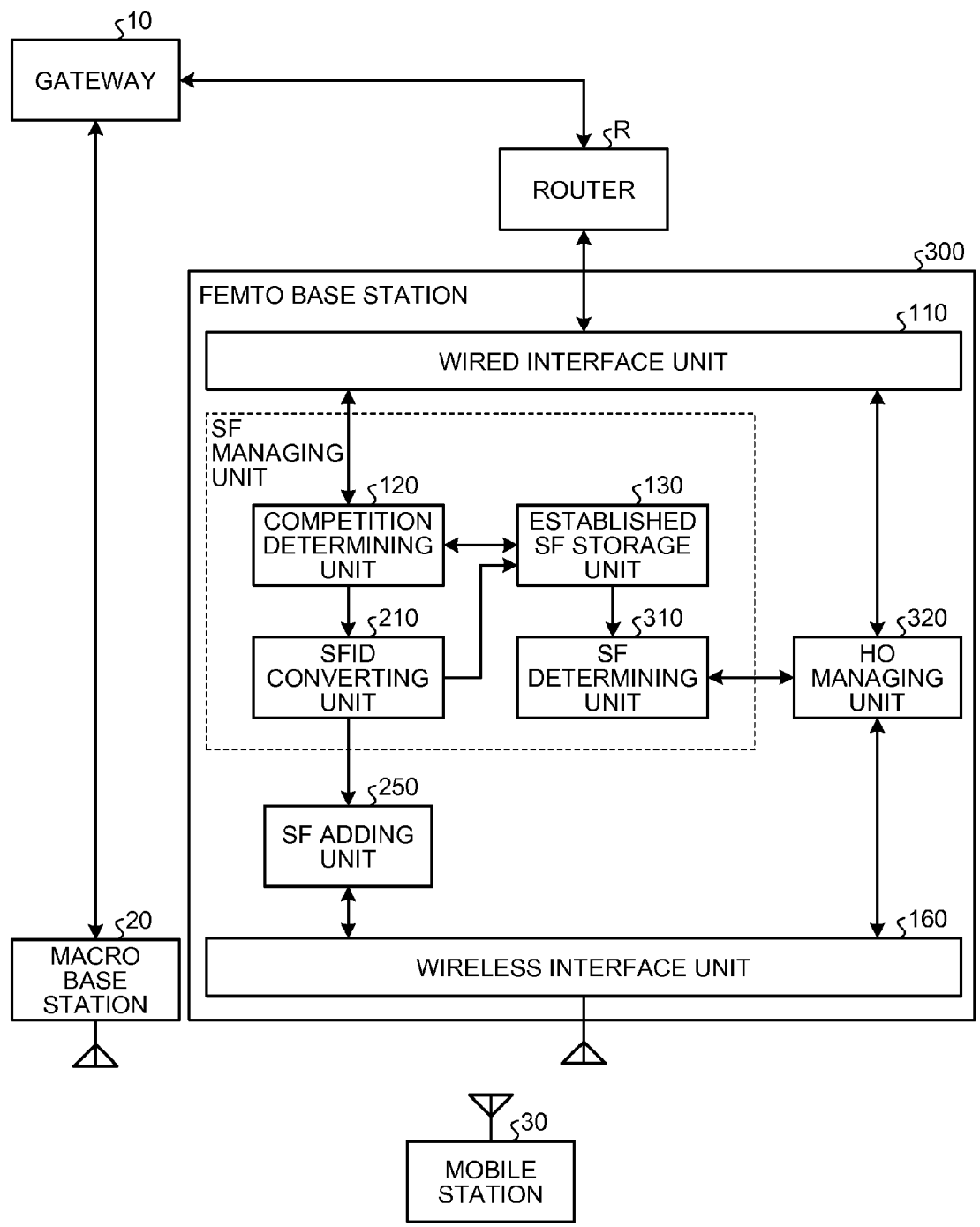
FIG. 9 is a block diagram of a structure of essential parts of a femto base station according to a third embodiment.

FIG. 9 is a block diagram of a structure of essential parts of a femto base station 300 according to the present embodiment. In FIG. 9, the same parts as those of FIGS. 2 and 5 are designated by the same reference numerals, and the explanation thereof will be omitted. The femto base station 300 depicted in FIG. 9 has the wired interface unit 110, the competition determining unit 120, the established SF storage unit 130, the SFID converting unit 210, a service flow determining unit (denoted as "SF determining unit" below) 310, an HO managing unit 320, the SF adding unit 250 and the wireless interface unit 160.

The SF determining unit 310 refers to the established SF storage unit 130 when the mobile station 30 hands over to the macro base station 20, and determines whether the service flow being established is for ASN or home network. Then, the SF determining unit 310 determines whether the ASN service flow has been converted in its SFID, and the information on the ASN service flow including the presence of the SFID conversion is output to the HO managing unit 320.

Specifically, when the fact that the mobile station 30 hands over is notified from the HO managing unit 320, the SF determining unit 310 selects only the ASN service flow as the service flow to be handed over to the macro base station 20 as the handover destination. Besides this, the SF determining unit 310 discriminates the presence or absence of the conversion of SFID of each service flow such that the service flow having the converted SFID is reestablished in the macro base station 20. The SF determining unit 310 outputs, to the HO managing unit 320, the information on the service flow having an unconverted SFID and to be handed over to the macro base station 20 as it is and the information on the service flow having a converted SFID and to be reestablished in the macro base station 20.

When the HO managing unit 320 detects that the mobile station 30 hands over to the macro cell of the macro base station 20, it notifies the SF determining unit 310 of the fact that the mobile station 30 will hand over. Then the HO managing unit 320 acquires, from the SF determining unit 310, the information on the service flow to be handed over to the macro base station 20 and the information on the service flow to be reestablished in the macro base station 20. The HO managing unit 320 transmits the message containing the information on the service flows to the macro base station 20 via the wired interface unit 110 and performs the processing for the handover of the mobile station 30. In other words, the HO managing unit 320 instructs the macro base station 20 to hand over the service flow having the unconverted SFID as it is and to reestablish the service flow having the converted SFID.

Figure 10:
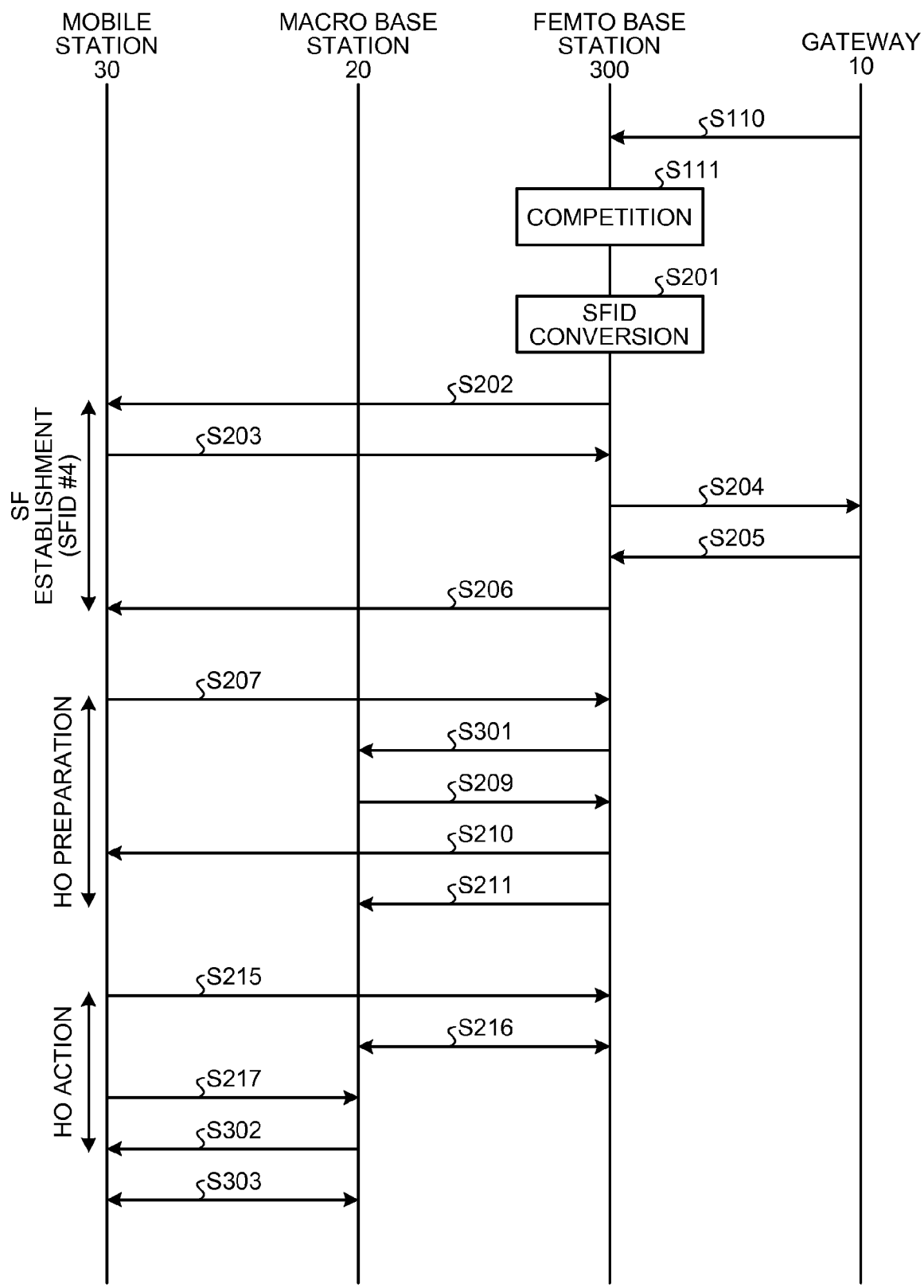
FIG. 10 is a sequence diagram of a service flow establishment method according to the third embodiment.

Next, a service flow establishment method in the communication system including the femto base station 300 configured as described above will be explained with reference to the sequence diagram depicted in FIG. 10. In FIG. 10, the same parts as those of FIGS. 3 and 7 are designated by the same reference numerals, and the detailed explanation thereof will be omitted. In the following, similarly to the second embodiment, there will be explained a case in which the mobile station 30 moves from the femto cell of the femto base station 300 to the macro cell of the macro base station 20 for handover.

In the present embodiment, like the first and second embodiments, the two service flows having SFID #1 and SFID #2 corresponding to the service flow addition request from the gateway 10 and the home network service flow having SFID #3 are established. In this state, when a new service flow addition request for SFID #3 is transmitted from the gateway 10 to the femto base station 200 (step S110), the competition determining unit 120 determines that the competition of SFIDs occurs (step S111).

The SFID which has been determined to be competitive (that is, SFID #3) is converted into an unused SFID (that is, SFID #4) by the SFID converting unit 210 (step S201). The converted SFID #4 is notified to the SF adding unit 250 and the service flow having SFID #4 is established by the SF adding unit 250. The service flow is established by the similar processing to those of the service flows having SFID #1 and SFID #2 (steps S202 to S206).

Thereafter, the handover is performed when the mobile station 30 moves to the macro cell of the macro base station 20. The handover is divided into two processing phases: preparation phase and action phase. The handover preparation phase is first started as follows. That is, when the mobile station 30 determines the macro base station 20 as the handover destination based on a comparison of reception power or the like, the message indicating that the handover destination of the mobile station 30 is the macro base station 20 is transmitted to the femto base station 300 (step S207). When this message is received by the wireless interface unit 160 in the femto base station 300, the HO managing unit 320 notifies the SF determining unit 310 of the fact that the mobile station 30 will hand over to the macro cell of the macro base station 20.

The SF determining unit 310 refers to the information on the service flow stored in the established SF storage unit 130, and determines whether the SFID of the ASN service flows each being established have been converted. The service flow whose SFID has not been converted is to be handed over to the macro base station 20 as it is, and the service flow whose SFID has been converted is to be reestablished in the macro base station 20. Specifically, the service flows having SFID #1 and SFID #2 are handed over to the macro base station 20 as they are, and the service flow whose SFID has been converted from SFID #3 to SFID #4 is reestablished in the macro base station 20. The SF determining unit 310 outputs, to the HO managing unit 320, the information on the service flow to be handed over to the macro base station 20 as it is and the information on the service flow to be reestablished in the macro base station 20.

The HO managing unit 320 transmits a handover request including an instruction of handing over and reestablishing the service flow to the macro base station 20 (step S301). Specifically, the instruction of handing over the service flows having SFID #1 and SFID #2 and the instruction of reestablishing the service flow whose SFID has been converted into SFID #4 as the service flow having SFID #3 are transmitted as the message for the handover request. The macro base station 20 which has received the handover request prepares for the handover of the mobile station 30 and transmits a response to the handover request to the femto base station 300 (step S209). Upon receiving the response, a response to the message from the mobile station 30 is transmitted by the HO managing unit 320 in the femto base station 300 (step S210), and ACK to the response to the handover request is returned to the macro base station 20 (Step S211).

With the above handover preparation phase, the macro base station 20 as the handover destination of the mobile station 30 grasps that the service flows having SFID #1 and SFID #2 are handed over from the femto base station 300 and that the service flow having SFID #3 is to be newly established. In this state, the handover action phase is started as follows. That is, when the message indicating that the mobile station 30 performs the handover is transmitted to the femto base station 300 (step S215), the execution of handover is finally fixed between the femto base station 300 and the macro base station 20 (step S216).

When the mobile station 30 requests the macro base station 20 to transmits a known signal specific to the macro base station 20 (step S217), the macro base station 20 superimposes the information on the service flows having SFID #1 and SFID #2 on the known signal and transmits the same to the mobile station 30, and then takes over the service flows having SFID #1 and SFID #2 (step S302). Further, the macro base station 20 establishes the service flow having SFID #3 which has been instructed to newly establish with respect to the mobile station 30 (step S303). With this, the mobile station 30 can use the same ASN service flow as the femto cell which is the handover source also in the macro cell as the handover destination. The SFIDs of the service flows to be established in the macro cell as the handover destination are SFIDs #1 to #3 and match with the SFID grasped by the gateway 10.

As described above, according to the present embodiment, when it is determined that the competition of SFIDs of the service flow requested to add and the established service flow occurs in the femto base station, the SFID of the service flow requested to add is converted and the service flow having the converted SFID is established with respect to the mobile station. Thus, even when the femto base station uniquely assigns SFID to the home network service flow, the competition of SFIDs can be prevented. Further, when the mobile station performs handover, the femto base station instructs the base station as handover destination to reestablish the service flow whose SFID has been converted. Therefore, even when the SFID has been converted in the femto base station, the service flow having appropriate SFID can be reestablished in the base station as handover destination when the mobile station hands over.

Further, compared to the second embodiment, since the service flow does not need to be temporarily deleted and reestablished in the femto base station 300, the number of messages to be exchanged between the femto base station 300 and the mobile station 30 can be reduced.

[d] Fourth Embodiment

A fourth embodiment according to the present invention is characterized in that when the femto base station establishes the home network service flow, a dummy path corresponding to the home network service flow is established with respect to the gateway.

Figure 11:
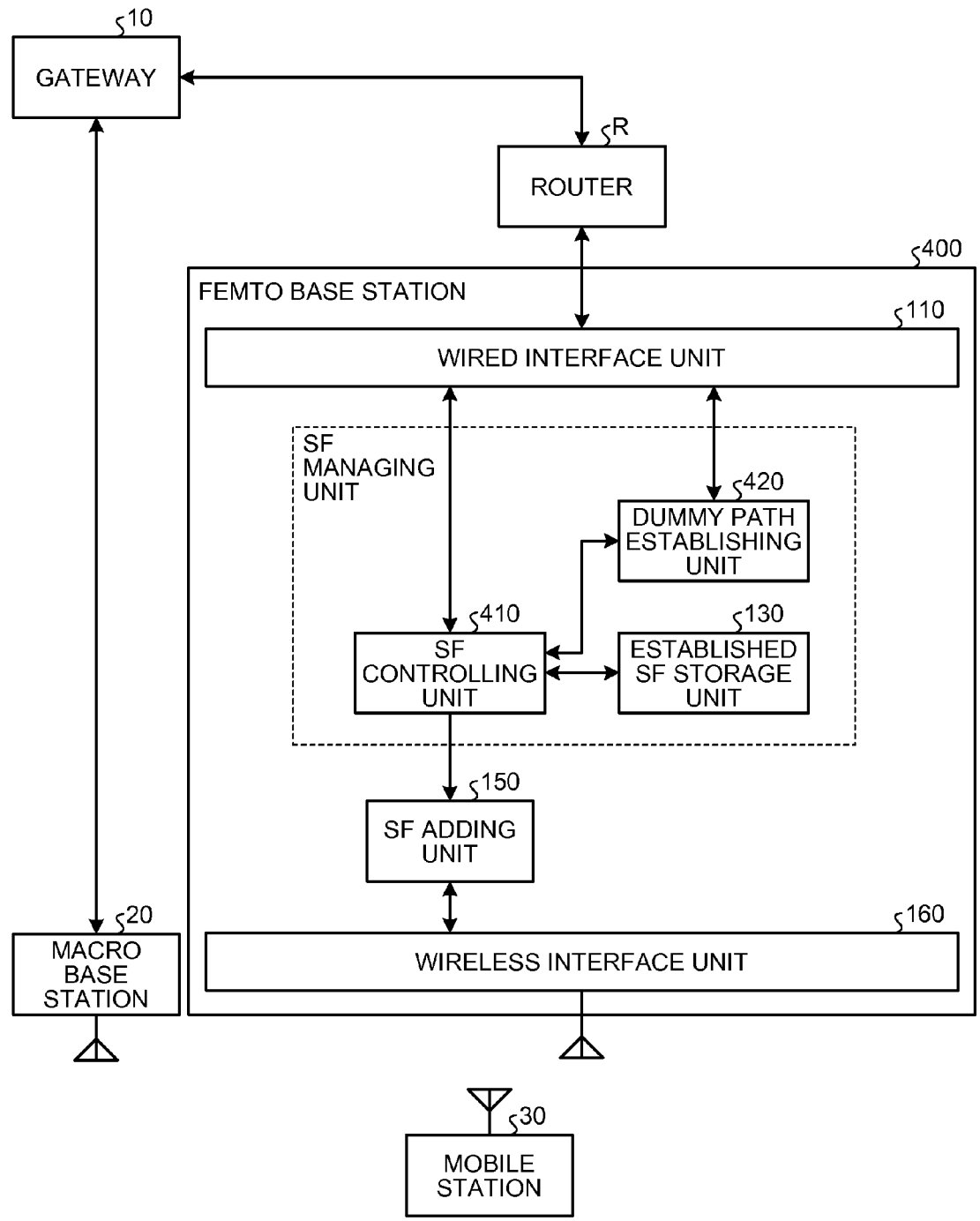
FIG. 11 is a block diagram of a structure of essential parts of a femto base station according to a fourth embodiment.

FIG. 11 is a block diagram of a structure of essential parts of a femto base station 400 according to the present embodiment. In FIG. 11, the same parts as those of FIG. 2 are designated by the same reference numerals, and the explanation thereof will be omitted. The femto base station 400 depicted in FIG. 11 has the wired interface unit 110, an SF controlling unit 410, a dummy path establishing unit 420, the established SF storage unit 130, the SF adding unit 150 and the wireless interface unit 160.

When a service flow addition request is received by the wired interface unit 110, the SF controlling unit 410 outputs the SFID contained in the service flow addition request to the SF adding unit 150 for adding the ASN service flow. Further, when the home network service flow is needed, the SF controlling unit 410 determines the SFID to be assigned to the service flow and outputs the same to the SF adding unit 150 for adding the home network service flow. At this time, the SF controlling unit 410 notifies the dummy path establishing unit 420 of the SFID of the home network service flow. When the service flow is newly added, the SF controlling unit 410 stores the information containing the SFID of the service flow to be added in the established SF storage unit 130.

When the SFID of the home network service flow is notified from the SF controlling unit 410, the dummy path establishing unit 420 establishes a dummy path corresponding to the notified SFID with respect to the gateway 10. In other words, the dummy path establishing unit 420 establishes a dummy path which is not used for actual data exchange with respect to the gateway 10, and assigns the SFID of the home network service flow to the dummy path.

Figure 12:
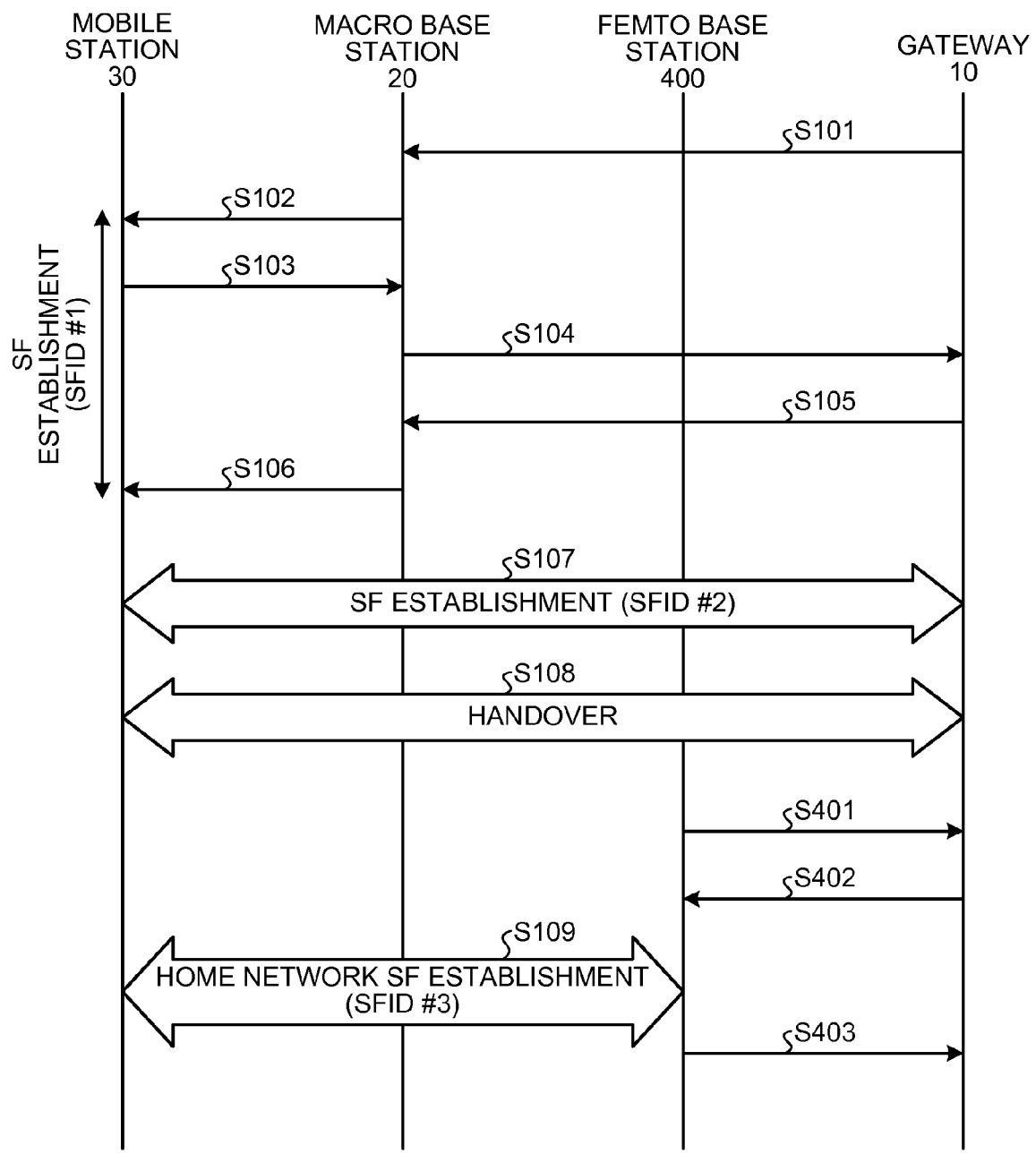
FIG. 12 is a sequence diagram of a service flow establishment method according to the fourth embodiment.

Next, a service flow establishment method in the communication system including the femto base station 400 configured as described above will be explained with reference to the sequence diagram depicted in FIG. 12. In FIG. 12, the same parts as those of FIG. 3 are designated by the same reference numerals, and the detailed explanation thereof will be omitted. In the following, similarly to the first embodiment, there will be explained a case in which the mobile station 30 moves from the macro cell of the macro base station 20 to the femto cell of the femto base station 400 for handover.

When the service flow is established between the mobile station 30 and the macro base station 20, the SFID to be assigned to the service flow is determined by the gateway 10, and the service flow addition request containing the determined SFID (such as SFID #1) is transmitted to the macro base station 20 (step S101). When the service flow addition request is received, the macro base station 20 establishes the wireless link corresponding to the service flow addition request with respect to the mobile station 30 and the service flow having the SFID (SFID #1) contained in the service flow addition request is established (steps S102 to S106). Further, the similar processing is performed by the macro base station 20 so that the service flow having SFID #2 is established (step S107). Since the service flows are added in response to the service flow addition request from the gateway 10, the anchor SFA function in the gateway 10 grasps that the service flows having SFID #1 and SFID #2 have been established.

In this state, when the mobile station 30 moves to the femto cell of the femto base station 400, the handover for switching the communication party of the mobile station 30 to the femto base station 400 is performed and the service flows having SFID #1 and SFID #2 are handed over to the femto base station 400 (step S108).

Since the femto base station 400 is connected to the home network via the router R, the home network service flow may be requested to add between the femto base station 400 and the mobile station 30. In this case, the SFID to be assigned to the home network service flow is determined by the SF controlling unit 410 in the femto base station 400 and the determined SFID is notified to the dummy path establishing unit 420. It is assumed herein that the SFID of the home network service flow is determined as SFID #3.

Then, the dummy path establishing unit 420 transmits a message for requesting to establish a dummy path of SFID #3 via the wired interface unit 110 and the request message is received by the gateway 10 (step S401). The gateway 10 performs a processing of establishing a path of SFID #3 with respect to the femto base station 400 and transmits a response message to the request message to the femto base station 400 (step S402). The request message for establishing the dummy path which is not used for actual data exchange has been transmitted from the dummy path establishing unit 420, but the gateway 10 cannot determine based on the request message whether the requested path is used for data exchange. Therefore, the gateway 10 establishes the dummy path similarly to the normal path with respect to the femto base station 400.

When the response message from the gateway 10 is received by the dummy path establishing unit 420 in the femto base station 400, the fact is notified to the SF controlling unit 410, and SFID #3 to be assigned to the home network service flow is notified to the SF adding unit 150 by the SF controlling unit 410. The SF adding unit 150 exchanges a message for establishing the home network service flow with respect to the mobile station 30 and newly adds the home network service flow (step S109). Then, after the establishment of the dummy path and the establishment of the home network service flow are completed, ACK to the response message of the dummy path establishment is returned to the gateway 10 from the wired interface unit 110 (step S403).

Typically, since the home network service flow is effective only between the femto base station 400 and the mobile station 30, the anchor SFA function in the gateway 10 does not grasp that the service flow having SFID #3 has been established. However, in the present embodiment, since the dummy path corresponding to SFID #3 has been established between the gateway 10 and the femto base station 400, even when the ASN service flow establishment is newly requested, the gateway 10 does not assign SFID #3 for the service flow. As a result, the competition between the SFID of the home network service flow uniquely established by the femto base station 400 and the SFID of the ASN service flow will not occur.

Next, a processing during an establishment of a home network service flow according to the present embodiment will be specifically explained with reference to FIG. 13.

Figure 13:
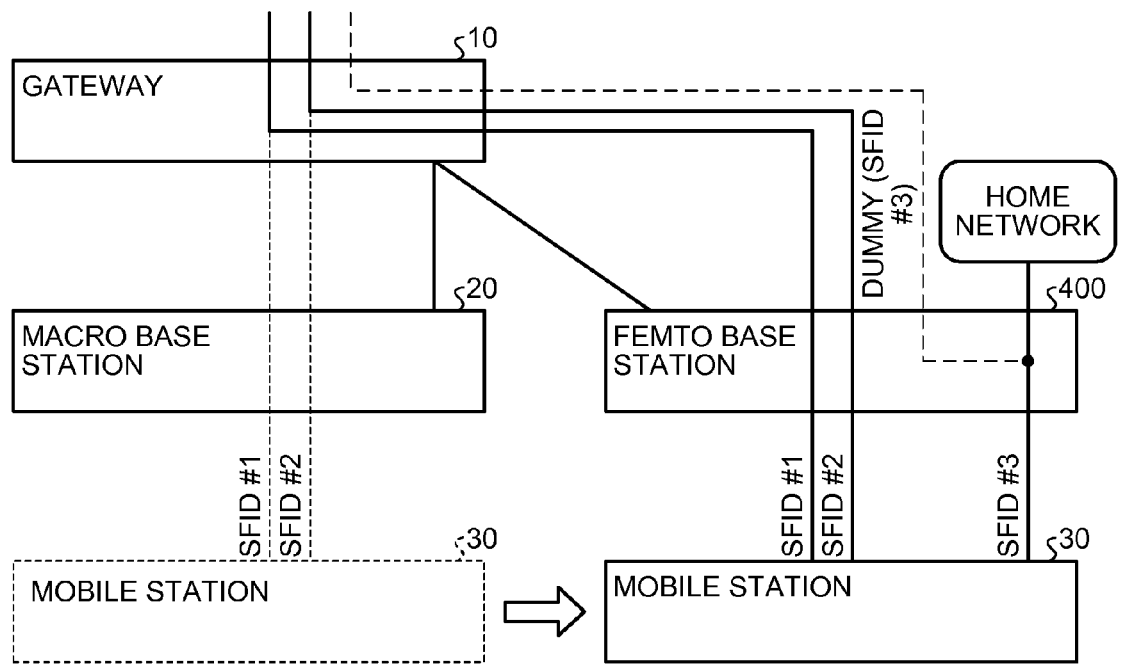
FIG. 13 is a schematic diagram of a service flow establishment according to the fourth embodiment.

As depicted in FIG. 13, the service flows having SFID #1 and SFID #2 are established while the mobile station 30 is making wireless communication with the macro base station 20, and the gateway 10 grasps that the mobile station 30 uses the service flows having SFID #1 and SFID #2. Even when the mobile station 30 hands over to start the wireless communication with the femto base station 400, the service flows having SFID #1 and SFID #2 are continued and the gateway 10 grasps that the mobile station 30 subsequently uses the service flows having SFID #1 and SFID #2.

In this state, when the femto base station 400 establishes the home network service flow having SFID #3, the dummy path for SFID #3 is established between the femto base station 400 and the gateway 10 by the initiative of the femto base station 400. Since the service flow having SFID #3 is actually for the home network, it is used only for exchanging data between the femto base station 400 and the mobile station 30. However, in the present embodiment, the dummy path which is not used for data exchange is established between the femto base station 400 and the gateway 10 so that the gateway 10 grasps that SFID #3 is being used.

Therefore, after that, when the gateway 10 newly transmits the ASN service flow addition request, SFID #3 will not be assigned as the SFID of the new service flow. Consequently, the competition of SFIDs between the ASN service flow and the home network service flow will not occur in the femto base station 400.

As described above, according to the present embodiment, when the home network service flow assigned with a unique SFID is established in the femto base station, the dummy path corresponding to the SFID of the service flow is established between the femto base station and the gateway. Thus, even when the femto base station uniquely assigns an SFID to the home network service flow, this SFID is not used by the gateway, thereby preventing the competition of SFIDs. Further, since the newly-introduced femto base station establishes a dummy path, the processing in the existing gateway does not need to be changed, thereby preventing an increase in cost.

[e] Fifth Embodiment

There has been explained the case in which the macro base station and the femto base station are connected to the same gateway in the first to fourth embodiments. However, since a plurality of gateways are provided in the ASN, when the mobile station hands over, a gateway connected to the base station as the handover source and a gateway connected to the base station as the handover destination may be different. In the fifth embodiment according to the present invention, there will be explained a case in which the mobile station hands over two gateways of the ASN. Generally, in such a case, the anchor SFA function for managing SFID for each mobile station is not handed over to a new gateway. However, in the present embodiment, when the mobile station moves to the femto cell of the femto base station, the management of the SFID of the mobile station is handed over to the anchor SFA function in the gateway connected to the femto base station.

Figure 14:
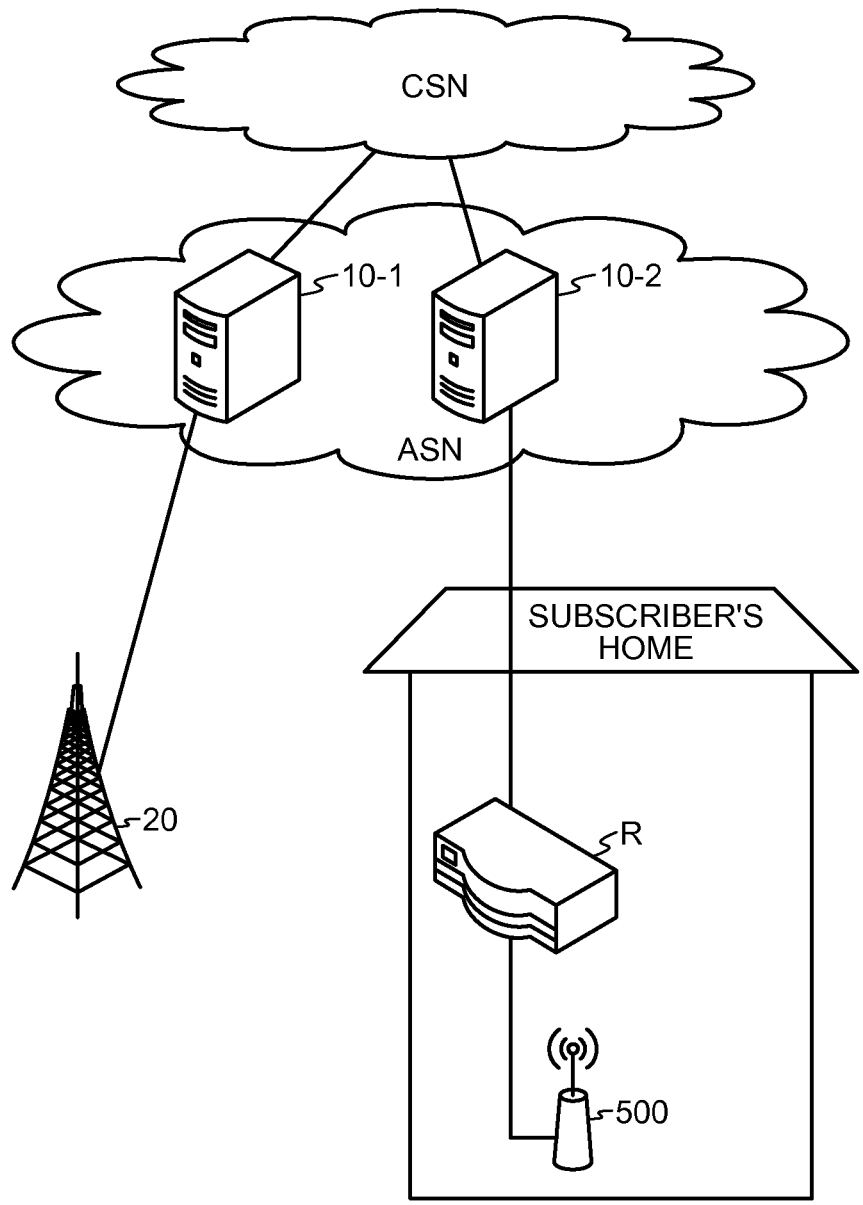
FIG. 14 is a diagram of a structure of a communication system according to a fifth embodiment.

FIG. 14 is a diagram of a structure of a communication system according to the present embodiment. As depicted in FIG. 14, the communication system according to the present embodiment includes the CSN and the ASN for accommodating the gateways 10-1, 10-2 and the macro base station 20. The gateway 10-1 is connected to the macro base station 20 while the gateway 10-2 is connected to a femto base station 500 via the router R at a subscriber's home. Though omitted in FIG. 14, the router R forms a home network including a server and the like.

Each of the gateways 10-1 and 10-2 has the anchor SFA function and manages the SFID of the service flow used by the mobile station being in wireless communication with the base station under the control (the macro base station 20 or the femto base station 500). When the mobile station hands over to the macro base station 20, the anchor SFA function is not handed over to the gateway 10-1, but when the mobile station hands over to the femto base station 500, the anchor SFA function is handed over to the gateway 10-2.

When the mobile station is handed over from other base station (such as the macro base station 20), the femto base station 500 performs relocation for taking over the anchor SFA function from the gateway (such as gateway 10-1) connected to the base station as handover source to the gateway 10-2. When the home network service flow is established, the femto base station 500 transmits, to the gateway 10-2, a reservation message for reserving SFID to be assigned to the home network service flow.

Figure 15:
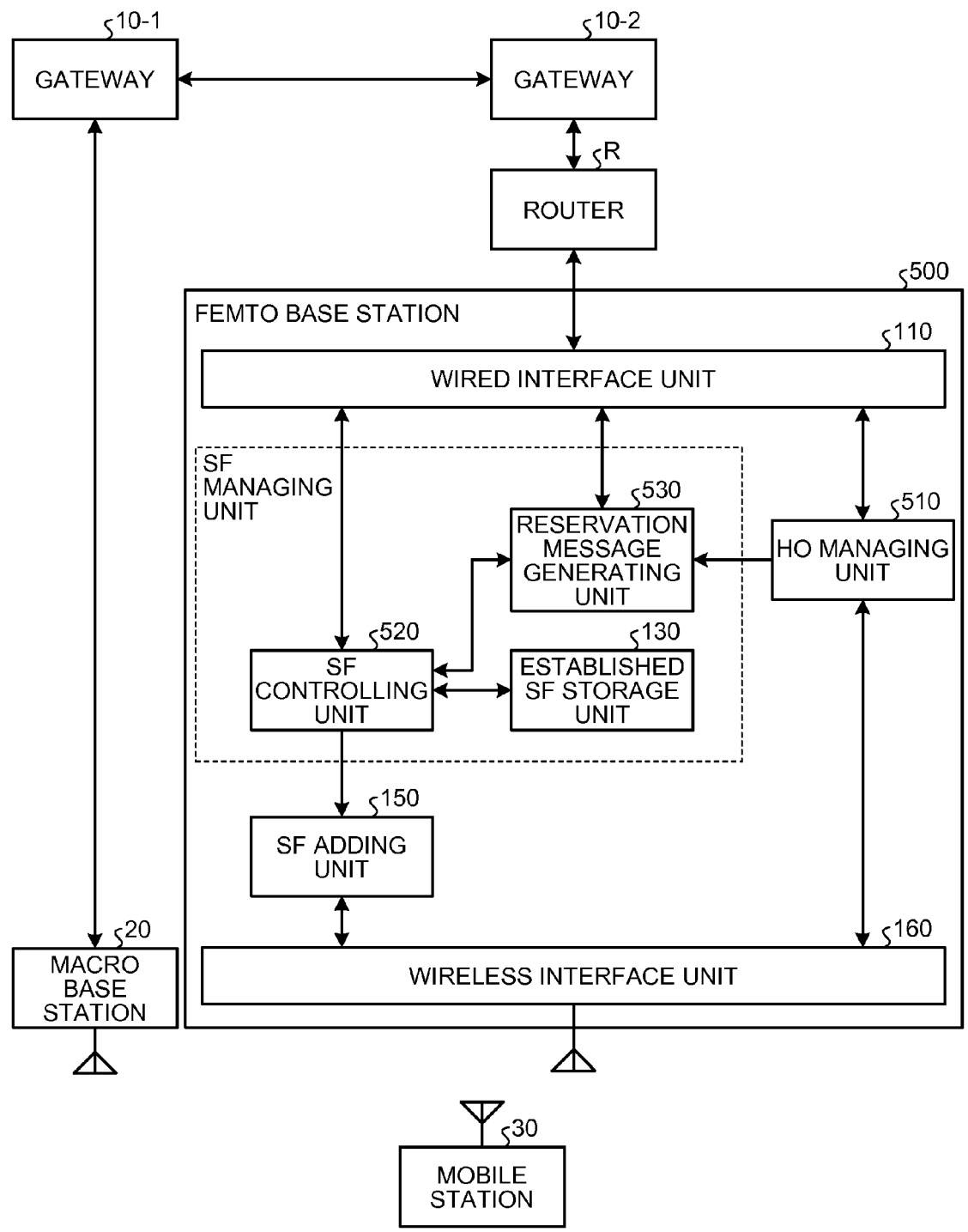
FIG. 15 is a block diagram of a structure of essential parts of a femto base station according to the fifth embodiment.

FIG. 15 is a block diagram of a structure of essential parts of the femto base station 500 according to the present embodiment. In FIG. 15, the same parts as those of FIG. 2 are designated by the same reference numerals, and the explanation thereof will be omitted. The gateways 10-1 and 10-2, the macro base station 20, the router R and the mobile station 30 are also depicted in FIG. 15. The femto base station 500 depicted in FIG. 15 has the wired interface unit 110, an HO managing unit 510, an SF controlling unit 520, a reservation message generating unit 530, the established SF storage unit 130, the SF adding unit 150 and the wireless interface unit 160.

When the HO managing unit 510 detects that the mobile station 30 hands over from other base station to the femto base station 500, the HO managing unit 510 performs the relocation for handing over the anchor SFA function relating to the mobile station 30 to the gateway 10-2. Specifically, in the case where the mobile station 30 hands over from the macro base station 20 to the femto base station 500, for example, the HO managing unit 510 exchanges a message with the gateways 10-1 and 10-2 and takes over the management of the SFID used by the mobile station 30 to the gateway 10-2. When the relocation is completed, the HO managing unit 510 notifies the reservation message generating unit 530 of the fact.

When a service flow addition request is received by the wired interface unit 110, the SF controlling unit 520 outputs the SFID contained in the service flow addition request to the SF adding unit 150 for adding the ASN service flow. When the home network service flow is needed, the SF controlling unit 520 determines the SFID to be assigned to the service flow and outputs the same to the SF adding unit 150 for adding the home network service flow. At this time, the SF controlling unit 520 also notifies the reservation message generating unit 530 of the SFID of the home network service flow. When the service flow is newly added, the SF controlling unit 520 stores the information containing the SFID of the service flow to be added in the established SF storage unit 130.

When the SFID of the home network service flow is notified from the SF controlling unit 520, the reservation message generating unit 530 generates a reservation message indicating that the notified SFID is used by the femto base station 500, and transmits the same to the gateway 10-2 via the wired interface unit 110. In other words, the reservation message generating unit 530 reserves the use of the SFID uniquely assigned by the femto base station 500 to prevent the same SFID as the SFID of the home network service flow from being used by the gateway 10-2.

Figure 16:
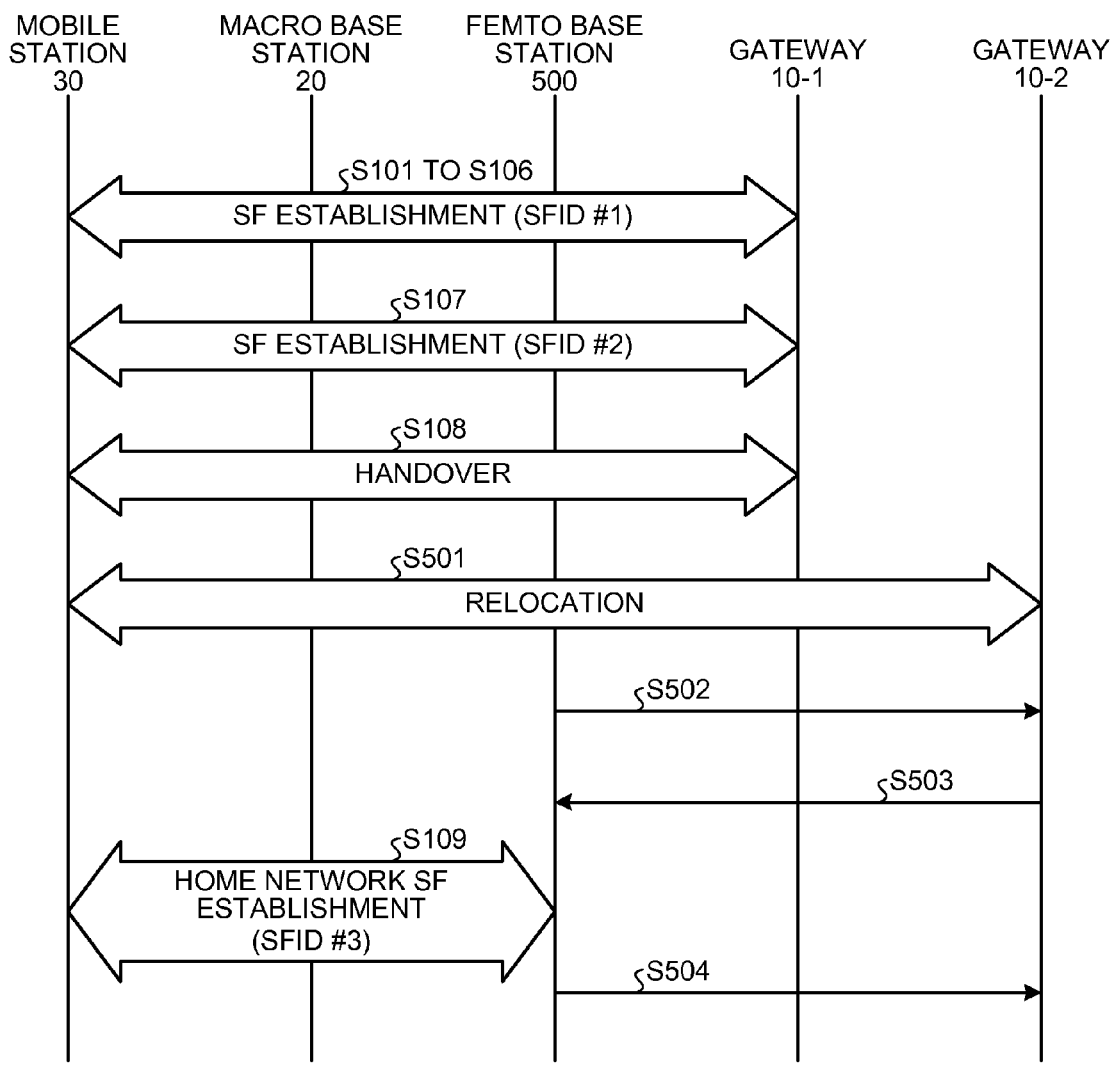
FIG. 16 is a sequence diagram of a service flow establishment method according to the fifth embodiment.

Next, a service flow establishment method in the communication system including the femto base station 500 configured as described above will be explained with reference to the sequence diagram depicted in FIG. 16. In FIG. 16, the same parts as those of FIG. 3 are designated by the same reference numerals, and the detailed explanation thereof will be omitted. In the following, similarly to the first and fourth embodiments, there will be explained a case in which the mobile station 30 moves from the macro cell of the macro base station 20 to the femto cell of the femto base station 500 for handover.

In the present embodiment, similarly to the first and fourth embodiments, the service flow having SFID #1 is established between the mobile station 30 and the macro base station 20 (steps S101 to S106), and the service flow having SFID #2 is similarly established (step S107). Since the service flows are added in response to the service flow addition request from the gateway 10-1 connected to the macro base station 20, the anchor SFA function in the gateway 10-1 grasps that the service flows having SFID #1 and SFID #2 are established.

In this state, when the mobile station 30 moves to the femto cell of the femto base station 500, the handover for switching the communication party of the mobile station 30 to the femto base station 500 is performed and the service flows having SFID #1 and SFID #2 are handed over to the femto base station 500 (step S108). In the general handover, even when the gateway as a higher device of the base station changes, the SFID of the service flow used by the mobile station is managed by the anchor SFA function in the gateway as the handover source. However, in the present embodiment, since the mobile station 30 hands over to the femto base station 500, the relocation is performed (step S501).

Specifically, when the HO managing unit 510 in the femto base station 500 detects that the mobile station 30 hands over from the macro base station 20 to the femto base station 500, a message is exchanged between the HO managing unit 510 and the gateways 10-1 and 10-2 so that the anchor SFA function relating to the mobile station 30 is handed over to the gateway 10-2. In this manner, in the present embodiment, when the mobile station 30 hands over to the femto base station 500, the gateway 10-2 takes over the anchor SFA function. Therefore, only the gateway 10-2 connected to the femto base station 500 needs to grasp the SFID of the service flow uniquely established by the femto base station 500. Thus, only the gateway connected to the femto base station needs to perform the different processing from the conventional anchor SFA function, thereby reducing an increase in cost due to the modification of the communication system.

When the anchor SFA function relating to the mobile station 30 is handed over from the gateway 10-1 to the gateway 10-2, and the relocation is completed, the fact is notified from the HO managing unit 510 to the reservation message generating unit 530. Thus, the reservation message generating unit 530 can transmit a reservation message to the gateway 10-2 and confirm that the use of the SFID can be reserved.

Since the femto base station 500 is connected to the home network via the router R, the home network service flow may be requested to add between the femto base station 500 and the mobile station 30. In this case, the SFID to be assigned to the home network service flow is determined by the SF controlling unit 520 in the femto base station 500, and the determined SFID is notified to the reservation message generating unit 530. It is assumed herein that the SFID of the home network service flow is determined as SFID #3.

A reservation message for reserving the use of SFID #3 is transmitted by the reservation message generating unit 530 via the wired interface unit 110, and the reservation message is received by the gateway 10-2 (step S502). The gateway 10-2 detects that SFID #3 is uniquely assigned in the femto base station 500 by the reservation message, and thereafter does not assign SFID #3 as the SFID of the service flow when the ASN service flow to be used by the mobile station 30 is established. Further, the gateway 10-2 transmits a response message to the reservation message to the femto base station 500 (step S503).

When the response message from the gateway 10-2 is received by the reservation message generating unit 530 in the femto base station 500, the fact is notified to the SF controlling unit 520, and SFID #3 to be assigned to the home network service flow is notified to the SF adding unit 150 by the SF controlling unit 520. Then, the SF adding unit 150 exchanges a message for establishing the home network service flow with the mobile station 30 and newly adds the home network service flow (step S109). After the use reservation of SFID and the establishment of the home network service flow are completed, ACK to the response message from the gateway 10-2 is returned from the wired interface unit 110 (step S504).

Generally, since the home network service flow is effective only between the femto base station 500 and the mobile station 30, the anchor SFA function in the gateway 10-2 does not grasp that the service flow having SFID #3 has been established. However, in the present embodiment, since the gateway 10-2 receives the SFID #3 reservation message from the femto base station 500 and thereafter does not use SFID #3, even when the establishment of the ASN service flow is newly requested, the gateway 10-2 does not assign SFID #3 for the service flow. As a result, the competition of SFIDs does not occur between the home network service flow uniquely established by the femto base station 500 and the ASN service flow. In the present embodiment, unlike the fourth embodiment, a dummy path is not established. Thus, a resource (such as bandwidth) in a relay device such as router or switch between the gateway and the femto base station is not uselessly occupied by the dummy path.

A processing during an establishment of a home network service flow according to the present embodiment will be specifically explained with reference to FIG. 17.

Figure 17:
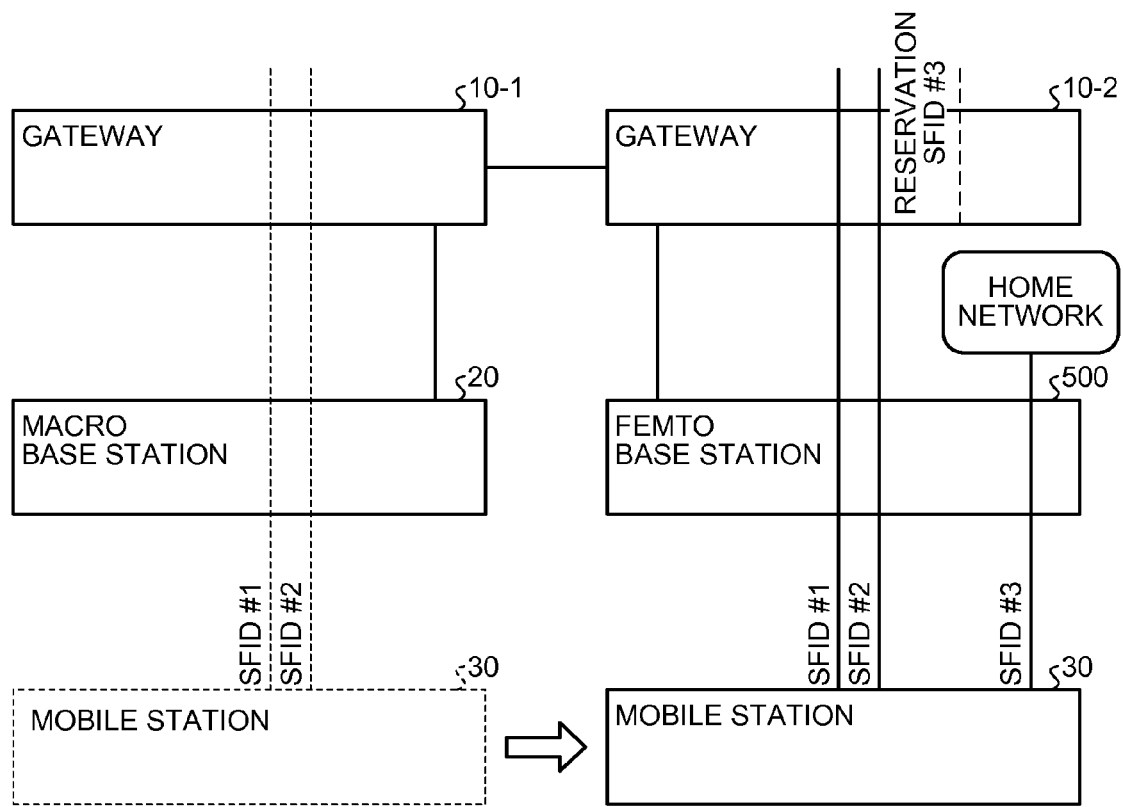
FIG. 17 is a schematic diagram of a service flow establishment according to the fifth embodiment.

As depicted in FIG. 17, while the mobile station 30 is making wireless communication with the macro base station 20, the service flows having SFID #1 and SFID #2 are established and the gateway 10-1 grasps that the mobile station 30 uses the service flows having SFID #1 and SFID #2. Even when the mobile station 30 hands over to start the wireless communication with the femto base station 500, the service flows having SFID #1 and SFID #2 are continued. In the present embodiment, since the mobile station 30 hands over to the femto base station 500, the relocation from the gateway 10-1 to the gateway 10-2 is performed so that the gateway 10-2 grasps that the mobile station 30 uses the service flows having SFID #1 and SFID #2.

In this state, when the femto base station 500 establishes the home network service flow having SFID #3, the femto base station 500 transmits a reservation message indicating that SFID #3 is assigned to the home network service flow for use to the gateway 10-2. The gateway 10-2 receives the reservation message to grasp that SFID #3 is being used.

Therefore, after that, when the gateway 10-2 newly transmits the ASN service flow addition request, SFID #3 is not assigned as the SFID of the new service flow. As a result, in the femto base station 500, the competition of SFIDs will not occur between the ASN service flow and the home network service flow.

As described above, according to the present embodiment, when the home network service flow assigned with a unique SFID is established in the femto base station, the use of the SFID of the service flow is reserved in the gateway. Thus, even when the femto base station uniquely assigns SFID to the home network service flow, the SFID is not used by the gateway, thereby preventing the competition of SFIDs. When the mobile station hands over to the femto base station, the relocation is performed so that the anchor SFA function in the mobile station is handed over to the gateway connected to the femto base station. Thus, only the gateway connected to the femto base station needs to reserve SFID, thereby minimizing modification of the communication system.

The service flow establishment method similar as in each embodiment described above can be realized by generating a service flow establishment program which describes the service flow establishment method of the femto base station explained in each embodiment in a computer executable form, and executing the service flow establishment program on the computer. At this time, it is also possible to store the service flow establishment program in a computer readable storage medium and to introduce the service flow establishment program into a computer though the storage medium.

According to the embodiments, it is possible to eliminate or prevent the competition of service flow identification information assigned to the service flows to be used by the mobile station.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A base station comprising:
 a receiving unit that receives a service flow addition request including an identifier of a first service flow which is assigned, by another apparatus, to the first service flow to be newly established with respect to a mobile station;
 a determining unit that determines whether a competition of identifiers occurs by determining whether the identifier of the first service flow and an identifier of a second service flow which is assigned, by the base station, to the second service flow established with respect to the mobile station are the same as each other;
 a changing unit that changes the identifier of the first service flow or the identifier of the second service flow, when the determining unit determines that the identifier of the first service flow and the identifier of the second service flow are the same as each other; and
 an establishing unit that establishes the first service flow by using the identifier of the first service flow with the competition being eliminated against the second service flow through the change by the changing unit, wherein the changing unit comprises:
 an adding unit that adds a service flow similar to the second service flow, the added service flow including a different identifier from that of the second service flow when the determining unit determines that the competition of identifiers occurs; and
 a deleting unit that deletes the second service flow after the service flow is added by the adding unit.

2. The base station according to claim 1, wherein the adding unit adds the service flow and the different identifier differs from identifiers of all established service flows including the second service flow.

3. The base station according to claim 1, wherein when the determining unit determines that the competition of identifiers occurs, the changing unit converts the identifier of the first service flow included in the service flow addition request into a different identifier from identifiers of all established service flows including the second service flow.

4. A base station comprising:
 a receiving unit that receives a service flow addition request including an identifier of a first service flow which is assigned, by another apparatus, to the first service flow to be newly established with respect to a mobile station;
 a determining unit that determines whether a competition of identifiers occurs by determining whether the identifier of the first service flow and an identifier of a second service flow which is assigned, by the base station, to the second service flow established with respect to the mobile station are the same as each other;

a changing unit that changes the identifier of the first service flow or the identifier of the second service flow, when the determining unit determines that the identifier of the first service flow and the identifier of the second service flow are the same as each other;

an establishing unit that establishes the first service flow by using the identifier of the first service flow with the competition being eliminated against the second service flow through the change by the changing unit, wherein when the determining unit determines that the competition of identifiers occurs, the changing unit converts the identifier of the first service flow included in the service flow addition request into a different identifier from identifiers of all established service flows including the second service flow; and the base station further comprises:

a detecting unit that detects that the mobile station hands over to other base station;

a deleting unit that deletes the first service flow whose identifier has been converted by the changing unit and deletes the second service flow, when the handover of the mobile station is detected by the detecting unit; and an adding unit that adds a service flow corresponding to the first service flow assigned with an unconverted identifier by the changing unit, after the first service flow and the second service flow are deleted by the deleting unit.

5. The base station according to claim 3, further comprising:

a detecting unit that detects that the mobile station hands over to other base station;

a determining unit that determines whether each of the established service flows is a service flow whose identifier has been converted by the changing unit, when the handover of the mobile station is detected by the detecting unit; and an instructing unit that instructs the other base station to reestablish the service flow whose identifier is determined to have been converted by the determining unit.

6. A communication system comprising a mobile station, a base station and a gateway apparatus, wherein the base station includes a receiving unit that receives a service flow addition request including an identifier of a first service flow which is assigned, by the gateway apparatus, to the first service flow to be newly established with respect to the mobile station;

a determining unit that determines whether a competition of identifiers occurs by determining whether the identifier of the first service flow and an identifier of a second service flow which is assigned, by the base station, to the second service flow established with respect to the mobile station are the same as each other;

a changing unit that changes the identifier of the first service flow or the identifier of the second service flow, when the determining unit determines that the identifier of the first service flow and the identifier of the second service flow are the same as each other; and an establishing unit that establishes the first service flow by using the identifier of the first service flow with the competition being eliminated against the second service flow through the change by the changing unit, wherein the changing unit comprises:

an adding unit that adds a service flow similar to the second service flow, the added service flow including a different identifier from that of the second service flow when the determining unit determines that the competition of identifiers occurs; and a deleting unit that deletes the second service flow after the service flow is added by the adding unit.

7. The communication system according to claim 6, wherein a transmitting unit transmits a message for requesting to establish a dummy path whose identifier is the same as of the service flow established by the establishing unit and which is not used for data exchange with respect to the gateway apparatus.

8. The communication system according to claim 6, wherein a transmitting unit transmits a reservation message indicating that the identifier of the service flow established by the establishing unit is being used to the gateway apparatus.

9. A non-transitory computer readable storage medium containing instructions that, when executed by a computer, causes the computer to perform:

receiving a service flow addition request including an identifier of a first service flow which is assigned, by another apparatus, to the first service flow to be newly established with respect to a mobile station;

determining whether a competition of identifiers occurs by determining whether the identifier of the first service flow and an identifier of a second service flow which is assigned, by the computer, to the second service flow established with respect to the mobile station are the same as each other;

changing the identifier of the first service flow or the identifier of the second service flow, when it is determined in the determining that the identifier of the first service flow and the identifier of the second service flow are the same as each other; and establishing the first service flow by using the identifier of the first service flow with the competition being eliminated against the second service flow through the change in the changing, wherein the changing comprises:

adding a service flow similar to the second service flow, the added service flow including a different identifier from that of the second service flow when the determining determines that the competition of identifiers occurs; and deleting the second service flow after the service flow is added by the adding.

10. A service flow establishment method performed by a base station, the service flow establishment method comprising:

receiving a service flow addition request including an identifier of a first service flow which is assigned, by another apparatus, to the first service flow to be newly established with respect to a mobile station;

determining whether a competition of identifiers occurs by determining whether the identifier of the first service flow and an identifier of a second service flow which is assigned, by the base station, to the second service flow established with respect to the mobile station are the same as each other;

changing the identifier of the first service flow or the identifier of the second service flow, when it is determined in the determining that the identifier of the first service flow and the identifier of the second service flow are the same as each other; and establishing the first service flow by using the identifier of the first service flow with the competition being eliminated against the second service flow through the change in the changing, wherein the changing comprises:

adding a service flow similar to the second service flow, the added service flow including a different identifier from that of the second service flow when the determining determines that the competition of identifiers occurs; and deleting the second service flow after the service flow is added by the adding.

* * * * *